(12) United States Patent
McRoberts

(10) Patent No.: US 9,424,615 B2
(45) Date of Patent: Aug. 23, 2016

(54) IN-GAME FOOTBALL STRATEGY SYSTEM AND METHOD

(71) Applicant: Championship Analytics, Inc., Cumming, GA (US)

(72) Inventor: Michael K. McRoberts, Cumming, GA (US)

(73) Assignee: Championship Analytics, Inc., Cumming, GA (US)

( * ) Notice: Subject to any disclaimer, the term of this patent is extended or adjusted under 35 U.S.C. 154(b) by 193 days.

(21) Appl. No.: 14/248,036

(22) Filed: Apr. 8, 2014

(65) Prior Publication Data

US 2015/0283450 A1 Oct. 8, 2015

(51) Int. Cl.
| | |
|---|---|
| *G06F 17/00* | (2006.01) |
| *A63F 9/24* | (2006.01) |
| *G06Q 50/20* | (2012.01) |
| *G06Q 10/10* | (2012.01) |
| *A63B 69/00* | (2006.01) |

(52) U.S. Cl.
CPC .............. *G06Q 50/20* (2013.01); *G06Q 10/10* (2013.01); *A63B 69/002* (2013.01)

(58) Field of Classification Search
None
See application file for complete search history.

(56) References Cited

U.S. PATENT DOCUMENTS

| | | | |
|---|---|---|---|
| 2012/0129585 A1* | 5/2012 | Laycock | G06Q 10/10 463/9 |
| 2014/0236331 A1* | 8/2014 | Lehmann | G09B 19/0038 700/93 |

OTHER PUBLICATIONS

Advanced NFL Stats, "Fourth Down Calculator," available at http://wp.advancednflstats.com/4thdncalc1.php at least as early as Oct. 25, 2013 (2 pages).
Advanced NFL Stats, "Analyzing the Patriots' 4th Down Calls," available at http://www.advancednflstats.com/2013/10/analyzing-patriots-4th-down-calls.html, Oct. 16, 2013 (5 pages).
Zeus (American football), available at http://en.wikipedia.org/wiki/Zeus_(American_football) at least as early as Oct. 25, 2013 (2 pages).
Andrew C. Gallagher, "NFL Coaching Based on Lots of Data," available at http://chenlab.ece.cornell.edu/people/Andy/footballDatamining.pdf at least as early as Apr. 4, 2014 (5 pages).
Championship Analytics, Inc., "Championship Analytics, Inc. a Game-changer for Coaches," Apr. 15, 2013 (1 page).
Championship Analytics, Inc., "Helping You Make Make the Right Call," Jan. 12, 2014 (6 pages).

* cited by examiner

*Primary Examiner* — Paul A D'Agostino
*Assistant Examiner* — Ankit Doshi
(74) *Attorney, Agent, or Firm* — Faegre Baker Daniels LLP

(57) ABSTRACT

A system and method are disclosed for determining and recommending a coaching decision during a football game, where the recommended coaching decision corresponds with the highest probability of winning the football game.

21 Claims, 24 Drawing Sheets

| Yards to Gain | Win Odds FG (Make) | Win Odds FG (Miss) | Make Rate FG | Win Odds Go For It (Make) | Win Odds Go For It (Miss) | Odds of Conversion | Final Win Odds FG | Final Win Odds Go For It | Final Win Odds Punt | Proper Decision |
|---|---|---|---|---|---|---|---|---|---|---|
| 1 | 51.5% | 39.3% | 72.7% | 64.0% | 39.9% | 75.3% | 48.2% | 58.0% | n/a | Go |
| 2 | 51.5% | 39.3% | 71.7% | 64.0% | 39.6% | 64.0% | 48.0% | 55.2% | n/a | Go |
| 3 | 51.5% | 39.3% | 70.5% | 64.0% | 39.3% | 59.3% | 47.9% | 54.0% | n/a | Go |
| 4 | 51.5% | 39.0% | 69.7% | 64.0% | 39.1% | 54.9% | 47.7% | 52.7% | n/a | Go |
| 5 | 51.5% | 38.8% | 69.2% | 64.0% | 38.8% | 50.7% | 47.6% | 51.6% | n/a | Go |
| 6 | 51.5% | 38.5% | 68.7% | 64.0% | 38.5% | 42.0% | 47.4% | 49.2% | n/a | Go |
| 7 | 51.5% | 38.3% | 67.4% | 64.0% | 38.3% | 39.8% | 47.2% | 48.5% | n/a | Go |
| 8 | 51.5% | 38.0% | 66.1% | 64.0% | 38.0% | 37.5% | 46.9% | 47.8% | n/a | Rec Go |
| 9 | 51.5% | 37.8% | 64.6% | 64.0% | 37.8% | 35.4% | 46.6% | 47.1% | n/a | Rec Go |
| 10 | 51.5% | 37.5% | 63.0% | 64.0% | 37.5% | 29.9% | 46.3% | 45.4% | n/a | Rec FG |
| 11 | 51.5% | 37.3% | 61.2% | 64.0% | 37.3% | 27.2% | 46.0% | 44.6% | n/a | FG |
| 12 | 51.5% | 37.0% | 59.0% | 64.0% | 37.0% | 24.8% | 45.6% | 43.7% | n/a | FG |
| 13 | 51.5% | 36.8% | 56.3% | 64.0% | 36.8% | 22.5% | 45.1% | 42.9% | n/a | FG |
| 14 | 51.5% | 36.6% | 53.2% | 64.0% | 36.6% | 20.5% | 44.5% | 42.2% | 42.6% | FG |
| 15 | 51.5% | 36.3% | 49.4% | 64.0% | 36.3% | 18.6% | 43.8% | 41.5% | 42.6% | FG |
| 16 | 51.5% | 36.1% | 44.8% | 64.0% | 36.1% | 17.0% | 43.0% | 40.8% | 42.6% | Rec FG |
| 17 | 51.5% | 35.9% | 39.4% | 64.0% | 35.9% | 15.5% | 42.0% | 40.2% | 42.6% | Rec Punt |
| 18 | 51.5% | 35.6% | 34.8% | 64.0% | 35.6% | 14.2% | 41.2% | 39.7% | 42.5% | Punt |
| 19 | 51.5% | 35.4% | 29.4% | 64.0% | 35.4% | 13.2% | 40.1% | 39.2% | 42.5% | Punt |
| 20 | 51.5% | 35.2% | 23.0% | 64.0% | 35.2% | 11.9% | 38.9% | 38.6% | 42.4% | Punt |

FIG. 21

IN-GAME FOOTBALL STRATEGY SYSTEM AND METHOD

FIELD OF THE DISCLOSURE

The present disclosure relates to a game strategy program and method. More particularly, the present disclosure relates to an in-game football strategy system and method.

BACKGROUND AND SUMMARY

American football is a popular sport worldwide. In the United States, football leagues exist at the professional level (e.g., the National Football League (NFL)), the collegiate level (e.g., the National Collegiate Athletic Association (NCAA)), the high school level, and other youth levels.

During the course of a typical football game, a coach is forced to make various strategic decisions. For example, when the coach's team is on offense and facing a fourth down play, the coach must decide whether to: (1) attempt a first down conversion by advancing the football to the first down marker ("Go For It"), (2) kick a field goal ("Field Goal"), or (3) punt the football to the opposing team ("Punt"). As another example, when the team is facing a point-after-touchdown or extra point play, the coach must decide whether to: (1) attempt a one-point conversion by kicking the football ("1 Point XP"), or (2) attempt a two-point conversion by advancing the football into the opponent's end zone ("2 Point XP").

In certain situations, the coach's decision may impact the outcome of the game. However, the decision may be subject to human error, bias, risk tolerance, and other factors.

The present disclosure provides a system and method for determining and recommending a coaching decision during a football game, where the recommended coaching decision corresponds with the highest probability of winning the football game.

According to an embodiment of the present disclosure, a method is provided for recommending one of a plurality of coaching decisions to a coach of a team playing a football game against an opponent. The method includes the steps of: receiving, before the football game, at least one indicator regarding a quality of the team; determining a probability of success for each coaching decision based, at least in part, on the at least one indicator; simulating a remainder of the football game following each coaching decision using a computing system; associating each coaching decision with a probability of winning the football game based on the simulating step; and recommending the coaching decision having the highest probability of winning the football game.

According to another embodiment of the present disclosure, a method is provided for recommending one of a plurality of coaching decisions to a coach of a team playing a football game against an opponent. The method includes the steps of: determining a probability of success for each coaching decision from each of a plurality of different positions on a football field; simulating a remainder of the football game from a first game scenario to determine a probability of winning the football game with each coaching decision in the first game scenario; displaying a first recommended coaching decision for each of the plurality of different positions on the football field corresponding to the first game scenario; simulating a remainder of the football game from a second game scenario to determine a probability of winning the football game with each coaching decision in the second game scenario; and displaying a second recommended coaching decision for each of the plurality of different positions on the football field corresponding to the second game scenario.

According to yet another embodiment of the present disclosure, a recommendation system is provided for a football game. The recommendation system includes a first visual representation including a first recommended coaching decision for each of a plurality of different positions on a football field, the first visual representation corresponding to a first game scenario, and a second visual representation including a second recommended coaching decision for each of the plurality of different positions on the football field, the second visual representation corresponding to a second game scenario different from the first game scenario.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein:

FIG. 21 is a table showing various win probability calculations;

DETAILED DESCRIPTION

Overview

Figure 1:
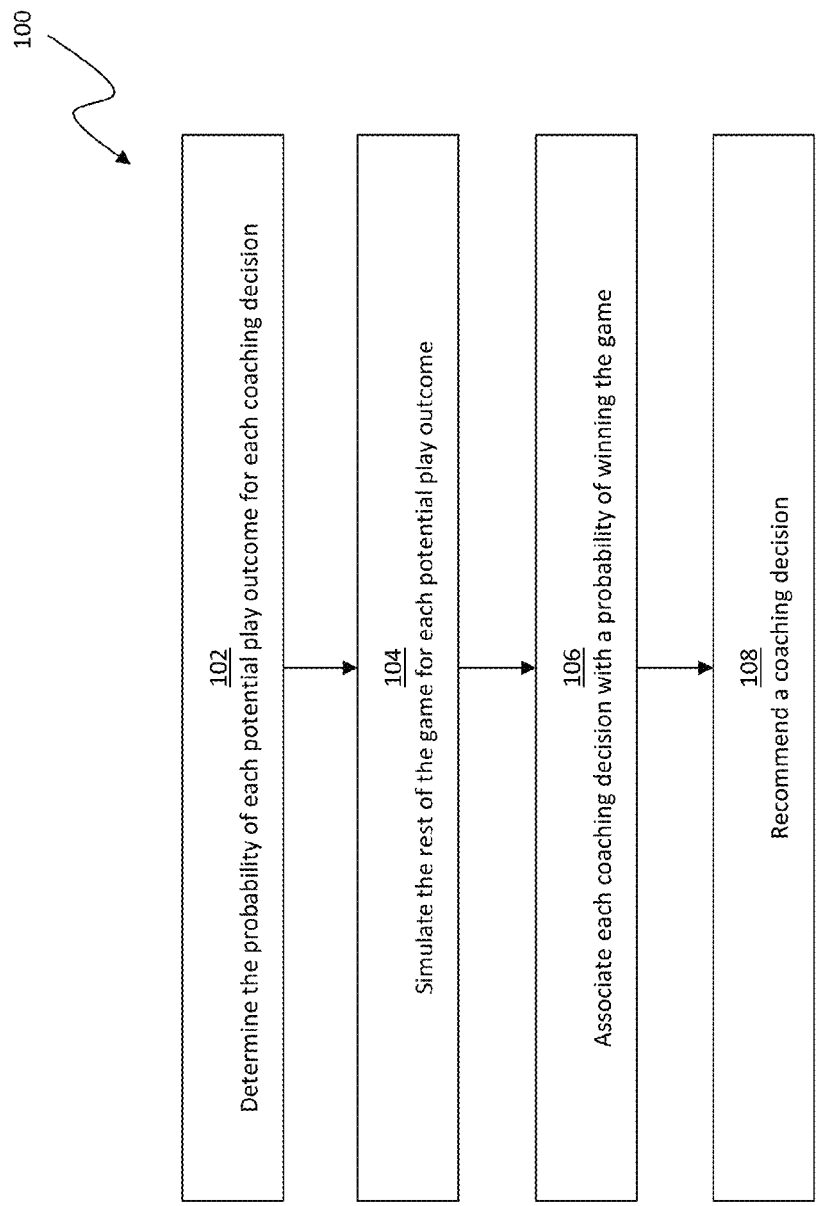
FIG. 1 is a flow chart illustrating an exemplary method of the present disclosure.

Referring initially to FIG. 1, a method 100 is provided for determining and recommending a coaching decision during a football game, where the recommended coaching decision corresponds with the highest probability of winning the football game. As discussed further below, method 100 may be customized and dynamic to account for various in-game situations, such as the strengths and weaknesses of the participating teams, the time remaining in the game, the current score differential, the current field position, weather conditions, whether the game is being played under professional or collegiate rules, and other factors.

In step 102, the probability of each potential play outcome for each coaching decision is determined. As discussed further below, the determining step 102 may accept various inputs to produce custom-tailored probabilities for each specific game.

Based on the probabilities from the determining step 102, the remainder of the football game is repeatedly simulated in step 104 for each coaching decision. The simulating step 104 may be performed hundreds or thousands of times for accuracy and reliability. Like the determining step 102, the simulating step 104 may accept various inputs to produce custom-tailored simulations for each specific game.

Based on the results of the simulating step 104, each coaching decision is associated with a probability of winning the football game ("Win Probability") in step 106.

In step 108, the coaching decision having the highest Win Probability based on the associating step 106 is communicated or recommended to the coach. As discussed further below, the recommending step 108 may involve generating a series of visual representations (e.g., charts) before the game based on potential scenarios that the coach may face during the game, or generating a real-time recommendation based on a particular scenario that the coach is facing during the game, such as over an Internet connection.

Computing System

Figure 2:
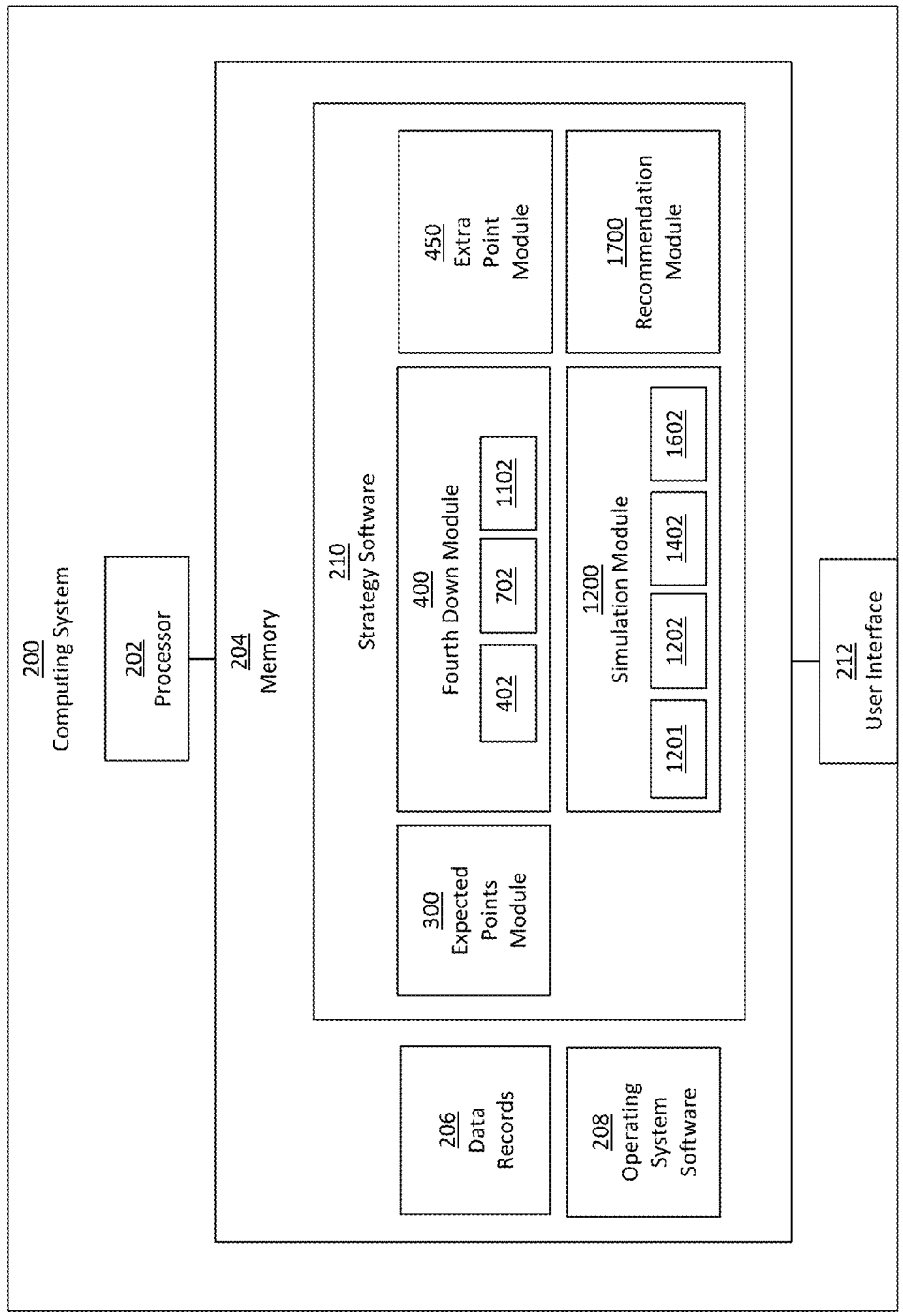
FIG. 2 is a schematic diagram of a computing system of the present disclosure, the computing system including a strategy program with an expected points module, a fourth down module, an extra point module, a game simulation module, and a recommendation module.

Referring next to FIG. 2, a computing system 200 is shown for performing method 100 of FIG. 1. Computing system 200 may be a general purpose computing device, such as a desktop computer, or a portable computing device, such as a laptop computer or a tablet computer, for example, that is programmed to perform method 100. Although computing system 200 is illustrated as a single computing system, it should be understood that multiple computing systems may be used together, such as across a network.

The illustrative computing system 200 of FIG. 2 includes a processor 202. Processor 202 may comprise a single processor or may include multiple processors, which may be local processors that are located locally within computing system 200 or remote processors that are accessible across a network.

The illustrative computing system 200 of FIG. 2 also includes a memory 204, which is accessible by processor 202. Memory 204 may be a local memory that is located locally within computing system 200 or a remote memory that is accessible across a network. Memory 204 is a computer-readable medium and may be a single storage device or may include multiple storage devices. Computer-readable media may be any available media that may be accessed by processor 202 and includes both volatile and non-volatile media. Further, computer-readable media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which may be used to store the desired information and which may be accessed by processor 102.

Memory 204 may include historical data records 206, as shown in FIG. 2. The data records 206 may include player, team, or league data on a play, drive, game, or season basis, for example.

Memory 204 may also include operating system software 208, as shown in FIG. 2. Exemplary operating system software 208 includes, for example, LINUX operating system software, or WINDOWS operating system software available from Microsoft Corporation of Redmond, Wash.

Memory 204 may further include a strategy software program 210, as shown in FIG. 2. As discussed further below, the strategy program 210 may include an expected points module 300, a fourth down module 400, an extra point module 450, a full game simulation module 1200, and a recommendation module 1700. An exemplary strategy program 210 is a spreadsheet program, such as EXCEL available from Microsoft Corporation.

Memory 204 may further include communications software (not shown) to provide access to a communications network. A suitable communications network includes a local area network, a public switched network, a CAN network, and any type of wired or wireless network. An exemplary public switched network is the Internet. Exemplary communications software includes e-mail software and internet browser software. Other suitable software that permits computing system 200 to communicate with other devices across a network may be used.

The illustrative computing system 200 of FIG. 2 further includes a user interface 212 having one or more I/O modules which provide an interface between an operator and computing system 200. Exemplary I/O modules include user inputs, such as buttons, switches, keys, a touch display, a keyboard, a mouse, and other suitable devices for providing information to computing system 200. Exemplary I/O modules also include user outputs, such as a printer, a touch screen display, a speaker, visual devices, audio devices, tactile devices, and other suitable devices for presenting information to a user.

Expected Points Module

Figure 3:
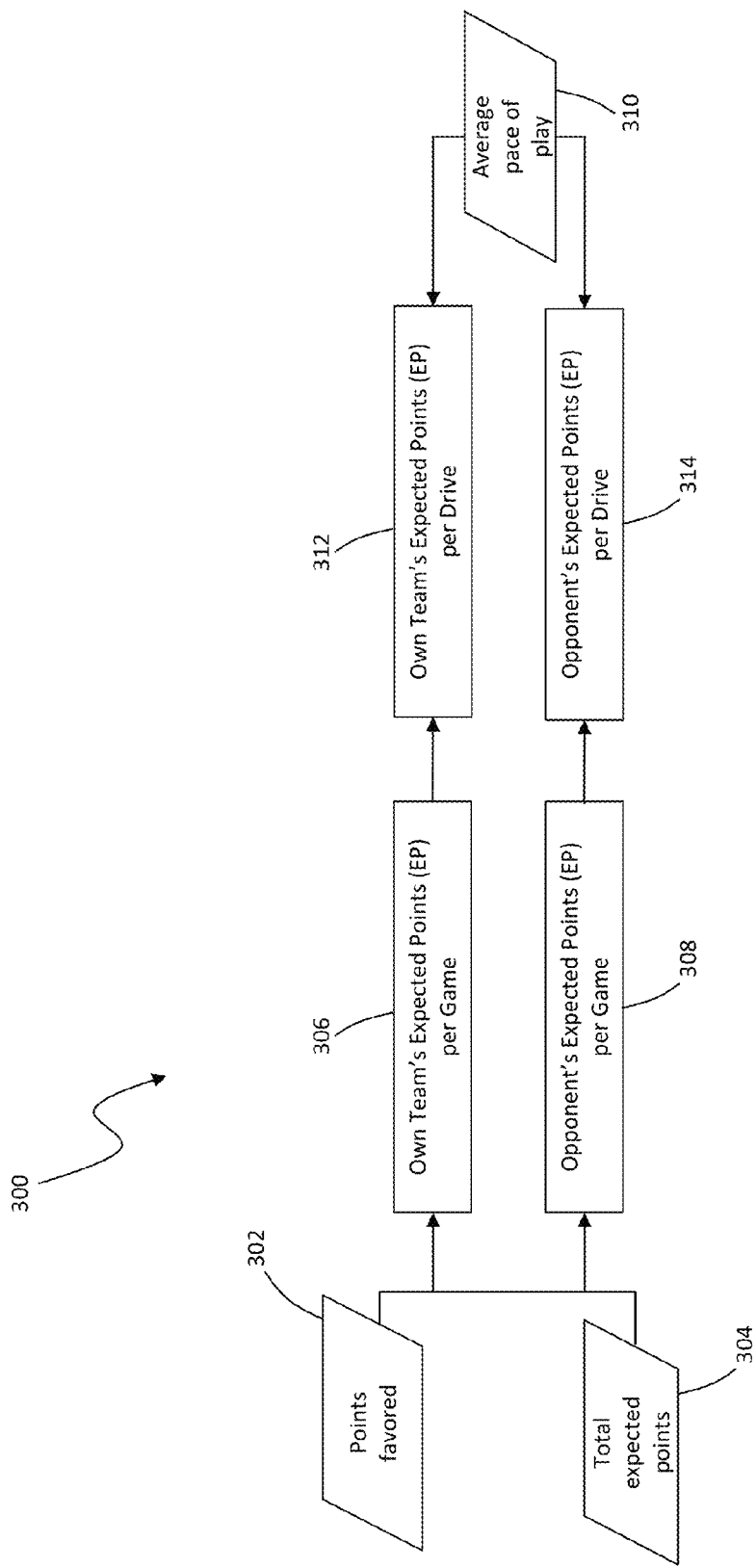
FIG. 3 is a flow chart of the expected points module.

Referring next to FIG. 3, the expected points module 300 determines the expected points (EP) of the team's offense versus the opponent's defense (which may also be referred to herein as the quality of the team's offense versus the opponent's defense), and the expected points (EP) of the opponent's offense versus the team's defense (which may also be referred to herein as the quality of the opponent's offense versus the team's defense).

Expected Points Per Game:

As shown in FIG. 3, the expected points module 300 receives a points favored input at block 302 and a total points expected input at block 304. Such inputs may be obtained before the game from a power rankings or betting source, such as Team Rankings, LLC. The inputs from blocks 302, 304 are specific to each match up and each game. Based on these inputs, the expected points module 300 calculates the team's own EP for the game versus the opponent at block 306 and the opponent's EP for the game versus the team at block 308, as follows:

Own Team's Expected Points=(Total expected points+ Points favored)/2

Opponent's Expected Points=(Total expected points− Points favored)/2

As an example, if a team is a 4-point underdog (i.e., favored by −4 points) in a game in which the total number of EP is 60, the team's own EP for the game would be 28 and the opponent's EP for the game would be 32.

Expected Points per Drive (Pace of Play):

Using the average pace of play (time per drive) of the team and its opponent from block 310, the EP per game may be converted to EP per drive at blocks 312, 314. Returning to the previous example, if the team is expected to score 28 points in the game and the average pace of play will accommodate 14 offensive drives per team, the team would be expected to score 2 points per offensive drive.

Fourth Down Module

The fourth down module 400 determines the probability of each potential play outcome for each coaching decision associated with a fourth down play. Exemplary coaching decisions and corresponding potential play outcomes for a fourth down play are set forth in Table 1.

TABLE 1

| Decision | Potential Play Outcomes |
| --- | --- |
| Go For It | 1. Conversion successful<br>2. Turnover and defensive touchdown<br>3. Conversion not successful |
| Field Goal | 1. Field goal successful<br>2. Field goal blocked for defensive touchdown<br>3. Penalty for first down<br>4. Field goal missed |
| Punt | 1. Touchback (TB)<br>2. Fumble loss by punt returner (FUM)<br>3. Aborted snap or blocked punt (AS)<br>4. Punt return for defensive touchdown (TD)<br>5. Major punt return for 25+ yards but no touchdown (MR)<br>6. Penalty for first down (FD)<br>7. Safety (S)<br>8. Normal punt and return (NP) |

Returning to FIG. 2, the fourth down module 400 may include a Go For It algorithm 402, a Field Goal algorithm 702, and a Punt algorithm 1102. The Go For It algorithm 402 determines the probability of each potential play outcome associated with the Go For It coaching decision. The Field Goal algorithm 702 determines the probability of each potential play outcome associated with the Field Goal coaching decision. The Punt algorithm 1102 determines the probability of each potential play outcome associated with the Punt coaching decision. Each algorithm 402, 702, 1102 is discussed further below.

(A) Go for it Algorithm

Figure 4:
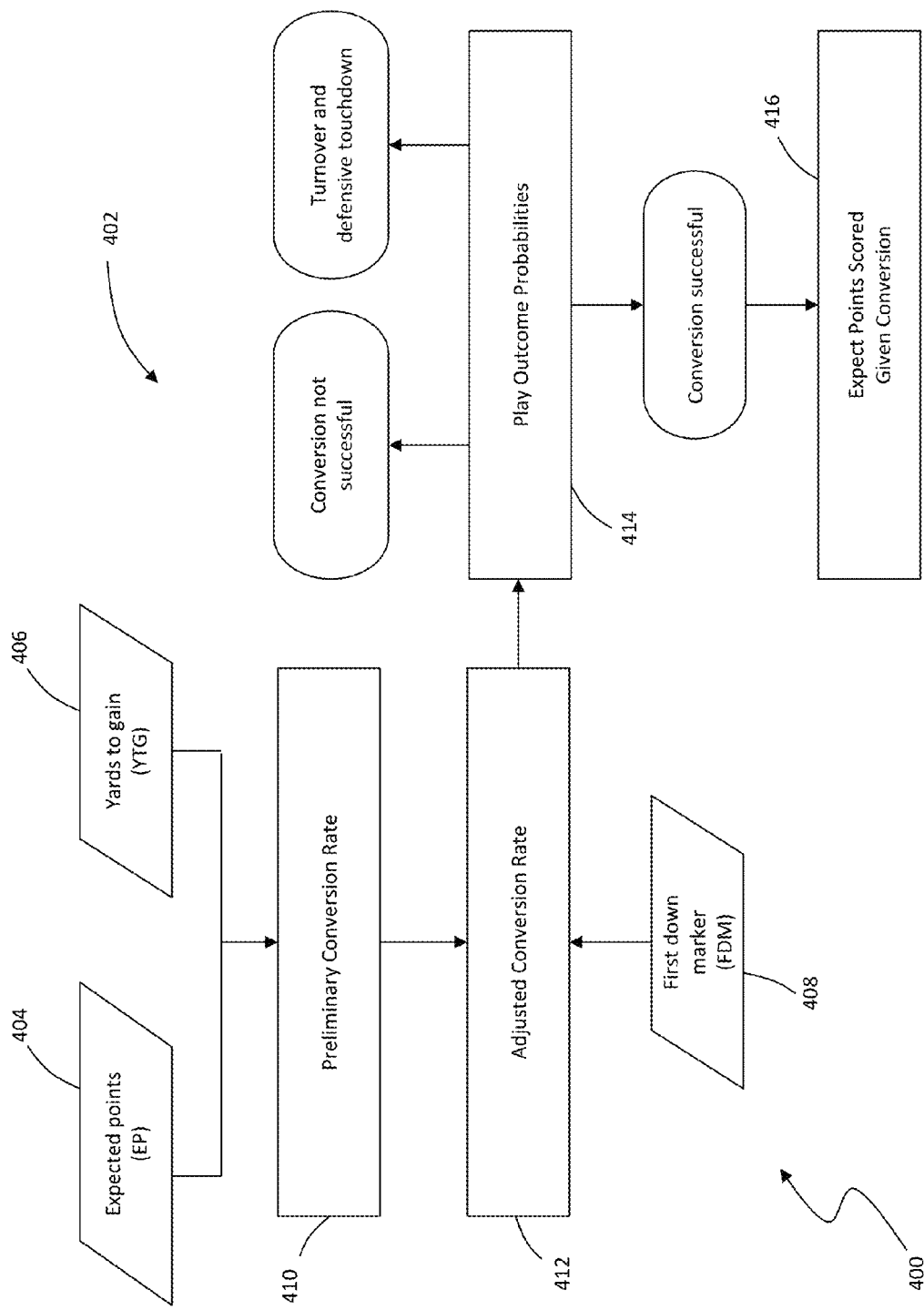
FIG. 4 is a flow chart of a Go For It algorithm of the fourth down module.

As shown in FIG. 4, the Go For It algorithm 402 determines the probability of each potential play outcome associated with the Go For It coaching decision on a fourth down play. The Go For It algorithm 402 receives an expected points (EP) input from the expected points module 300 (FIG. 3) at block 404, a yards to gain (YTG) for first down input at block 406, and a first down marker (FDM) yard line input at block 408.

Figure 5:
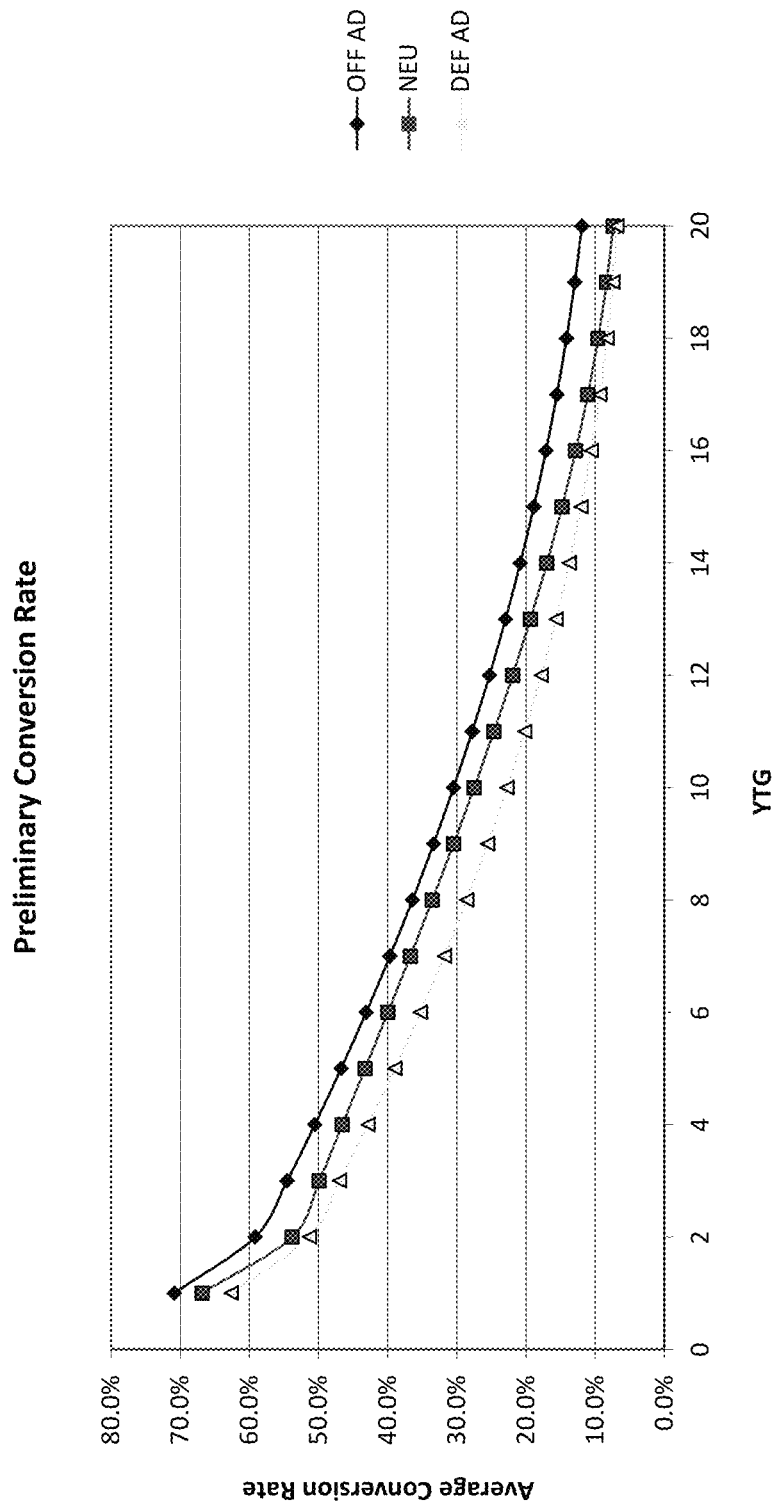
FIG. 5 is a graph showing historical fourth down conversion rates.

Preliminary Conversion Rate:

At block 410, the Go For It algorithm 402 uses the team's EP value from block 404 and the YTG distance from block 406 to determine a preliminary first down conversion rate based on historical conversion data. Historical first down conversion data is shown in the form of a chart in FIG. 5, where YTG distances are presented on the x-axis and average first down conversion rates are presented on the y-axis. This historical data shows that the likelihood of a first down conversion decreases as the YTG distance increases. Individual lines or equations may be presented to account for various EP values. For simplicity, FIG. 5 shows three lines to account for scenarios in which the offense and defense are an equal match with the same EP values (NEU), the offense has the advantage (OFF AD), and the defense has the advantage (DEF AD). The historical data presented in FIG. 5 shows that stronger offenses will convert first downs versus weaker defenses (OFF AD) more often than weaker offenses will convert first downs versus stronger defenses (DEF AD). Similar lines may be provided for specific EP values (e.g., 7-66 points). By determining the first down conversion rate at each YTG distance for each offensive match-up, the Go For It algorithm 402 is able to predict the likelihood of a first down conversion with great precision.

Adjusted Conversion Rate (Field Position Multiplier):

Inside an opponent's 20-yard line (i.e., in the Red Zone), it becomes more difficult to convert for a first down as the space on the field from which to work becomes more limited. As the FDM gets closer to the end zone and the YTG distance increases, the challenge of converting a first down gets progressively more difficult versus similar scenarios outside of the Red Zone. To account for the challenge of converting a first down in the Red Zone, the Go For It algorithm 402 may multiply the preliminary conversion rate by a field position multiplier at block 412 based on the YTG distance from block 406 and the FDM yard line from block 408 (where 100 represents the opponent's goal line), as follows:

Adjusted Conversion Rate=Preliminary Conversion Rate*Field Position Multiplier

Exemplary field position multipliers are set forth in Table 2 below. When the field position multiplier is less than 100%, the adjusted conversion rate will be less than the preliminary conversion rate.

TABLE 2

| | FDM Yard Line | | | | | | | | | |
| --- | --- | --- | --- | --- | --- | --- | --- | --- | --- | --- |
| YTG | 100 | 99 | 98 | 97 | 96 | 95 | 94 | 93 | 92 | 91 | 90 |
| 1 | 74.6% | 77.6% | 80.6% | 83.6% | 86.6% | 89.6% | 91.0% | 94.0% | 97.0% | 100.0% | 100.0% |
| 2 | 85.5% | 91.1% | 92.9% | 94.8% | 96.7% | 98.5% | 100.0% | 100.0% | 100.0% | 100.0% | 100.0% |
| 3 | 69.6% | 73.4% | 75.4% | 76.4% | 79.4% | 82.5% | 85.4% | 87.6% | 88.6% | 93.8% | 97.9% |
| 4 | 63.6% | 65.8% | 67.9% | 67.9% | 72.2% | 76.5% | 80.8% | 85.1% | 87.3% | 91.5% | 95.8% |
| 5 | 60.8% | 62.9% | 65.2% | 66.5% | 70.4% | 74.1% | 77.3% | 80.1% | 82.4% | 89.8% | 92.2% |

Goal algorithm 702 determines the probability of each potential play outcome associated with the Field Goal coaching decision. The Punt algorithm 1102 determines the probability As an example, take a team that normally has a 50% fourth down conversion rate with 2 YTG. If the team faces a fourth down play with 2 YTG outside of the Red Zone, the conversion rate may remain at 50%. However, if the team faces a fourth down play with 2 YTG in the Red Zone, such as from the opponent's 2-yard line when the FDM is on the opponent's goal line (FDM=100), the normal 50% conversion rate may be multiplied by the corresponding field position multiplier of 85.5% to arrive at a lower adjusted conversion rate of 42.7%.

Adjusted Conversion Rate (Optional YTG Multiplier):

A coach may choose to further adjust his team's first down conversion rate at block 412 based on particular strengths of his team. In one embodiment, the Go For It algorithm 402 multiplies the conversion rate by one or more additional multipliers, such as a YTG multiplier, which may be specified by the coach. As an example, a team that thrives on running the football might find that it converts short-yardage situations particularly well, because its offense is designed to consistently grind out short gains. However, the same team may have particular difficulty in converting longer-yardage situations because the offense isn't conducive to big plays. In this example, the YTG multiplier may be greater than 100% below 5 YTG to increase the conversion rate in short-yardage situations and less than 100% above 5 YTG to decrease the conversion rate in long-yardage situations. Conversely, a team with an explosive offense may be particularly effective in converting long yardages but may not have the personnel to get short yardage. In this example, the YTG multiplier may be less than 100% below 5 YTG to decrease the conversion rate in short-yardage situations and greater than 100% above 5 YTG to increase the conversion rate in long-yardage situations. The Indianapolis Colts were a great example of this during much of the Peyton Manning era. They were very dangerous in long-yardage situations due to the quality of their passing game, but due to a poor running game, they often failed to convert in short-yardage scenarios.

Defensive Touchdown:

The Go For It algorithm 402 may calculate the probability of a turnover and defensive touchdown as a function of the EP value from block 404 and the FDM yard line from block 408. This probability may be as low as about 0.1% and as high as about 0.5%.

Play Outcome Probabilities:

At block 414, the Go For It algorithm 402 assigns probabilities to each potential conversion outcome, as set forth in Table 3 below.

TABLE 3

| Decision | Potential Play Outcomes | Probability |
| --- | --- | --- |
| Go For It | 1. Conversion successful | Adjusted Conversion Rate |
| | 2. Turnover and defensive touchdown | 0.1%-0.5% |
| | 3. Conversion not successful | Balance |
| | | 100% (Total) |

If additional play outcomes are identified, such as a turnover for a major return without a touchdown, appropriate probabilities may be assigned to each additional play outcome with an unsuccessful conversion accounting for the balance. The Go For It algorithm 402 may communicate these probabilities to the full game simulation module 1200 and/or the recommendation module 1700 (FIG. 2), both of which are discussed further below.

Figure 6:
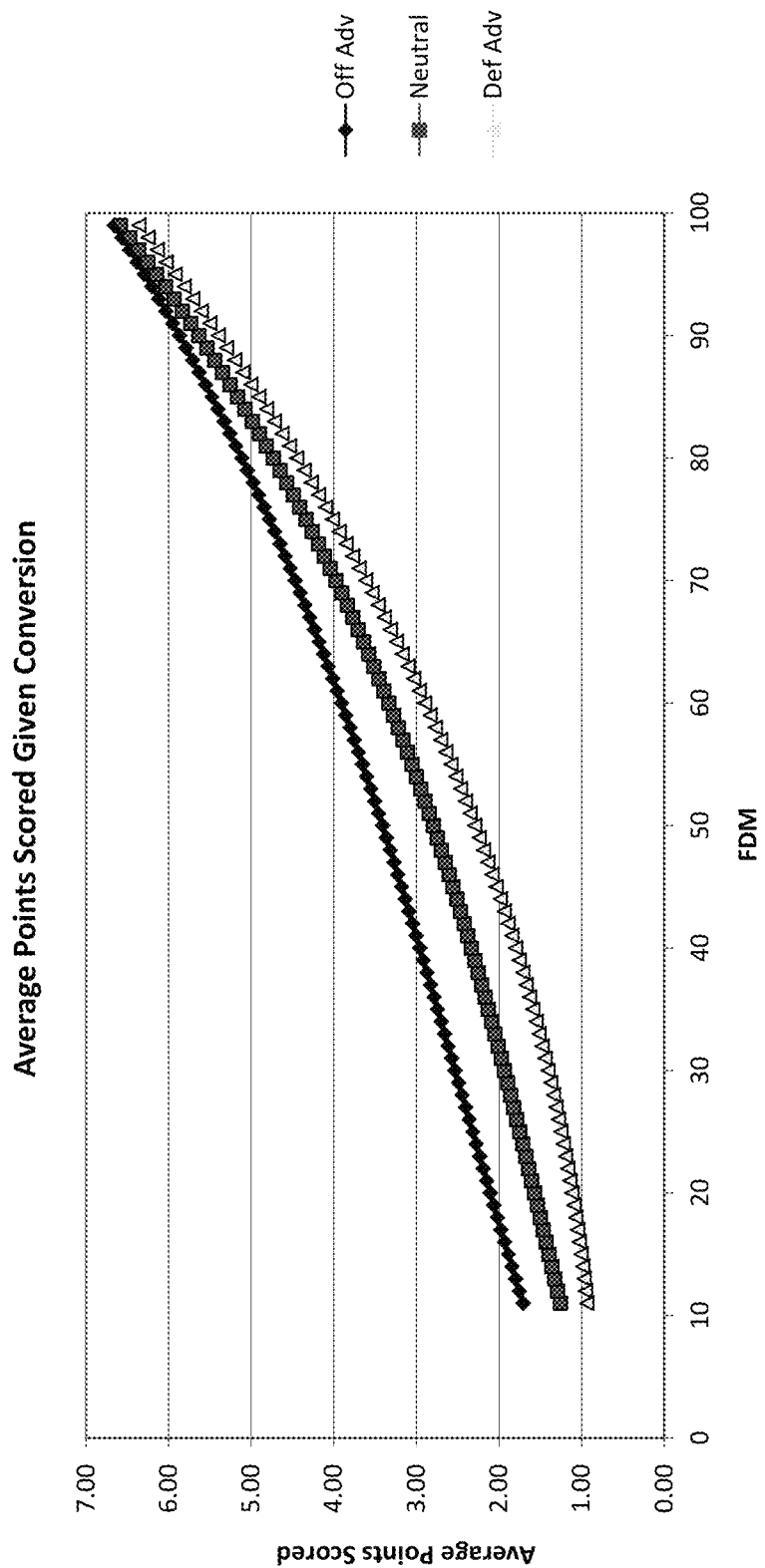
FIG. 6 is a graph showing average points scored given a first down conversion.

Expected Points Scored Given Conversion:

The Go For It algorithm 402 may determine not only the likelihood of a first down conversion at block 412, but also how likely the team is to score points if the conversion is successful at block 416. After a successful conversion, the team could get just enough yards to get the first down and still not score any points on the drive, or it could score a touchdown on the very same play or a subsequent play of the same drive. Therefore, the Go For It algorithm 402 may take into account the potential upside of the drive should the fourth down play be successful at any field position. At block 416, the Go For It algorithm 402 uses the team's EP value from block 404 and the FDM yard line from block 408 to determine the points scored given conversion based on historical scoring data. Historical scoring data is shown in the form of a chart in FIG. 6, where FDM yard lines are presented on the x-axis (with 0 representing the team's own goal line and 100 representing the opponent's goal line) and average points scored given conversion are presented on the y-axis. This historical data shows that the likelihood of scoring points increases as the FDM approaches the opponent's goal line. Individual lines or equations may be presented to account for various EP values. For simplicity, FIG. 6 shows three lines to account for scenarios in which the offense and defense are an equal match with the same EP values (NEU), the offense has the advantage (OFF AD), and the defense has the advantage (DEF AD). The historical data presented in FIG. 6 shows that stronger offenses will score more points versus weaker defenses (OFF AD) than weaker offenses will score versus stronger defenses (DEF AD). Similar lines may be provided for specific EP values (e.g., 7-66 points). The Go For It algorithm 402 may communicate the points scored to the full game simulation module 1200, which is discussed further below.

(B) Field Goal Algorithm

Figure 7:
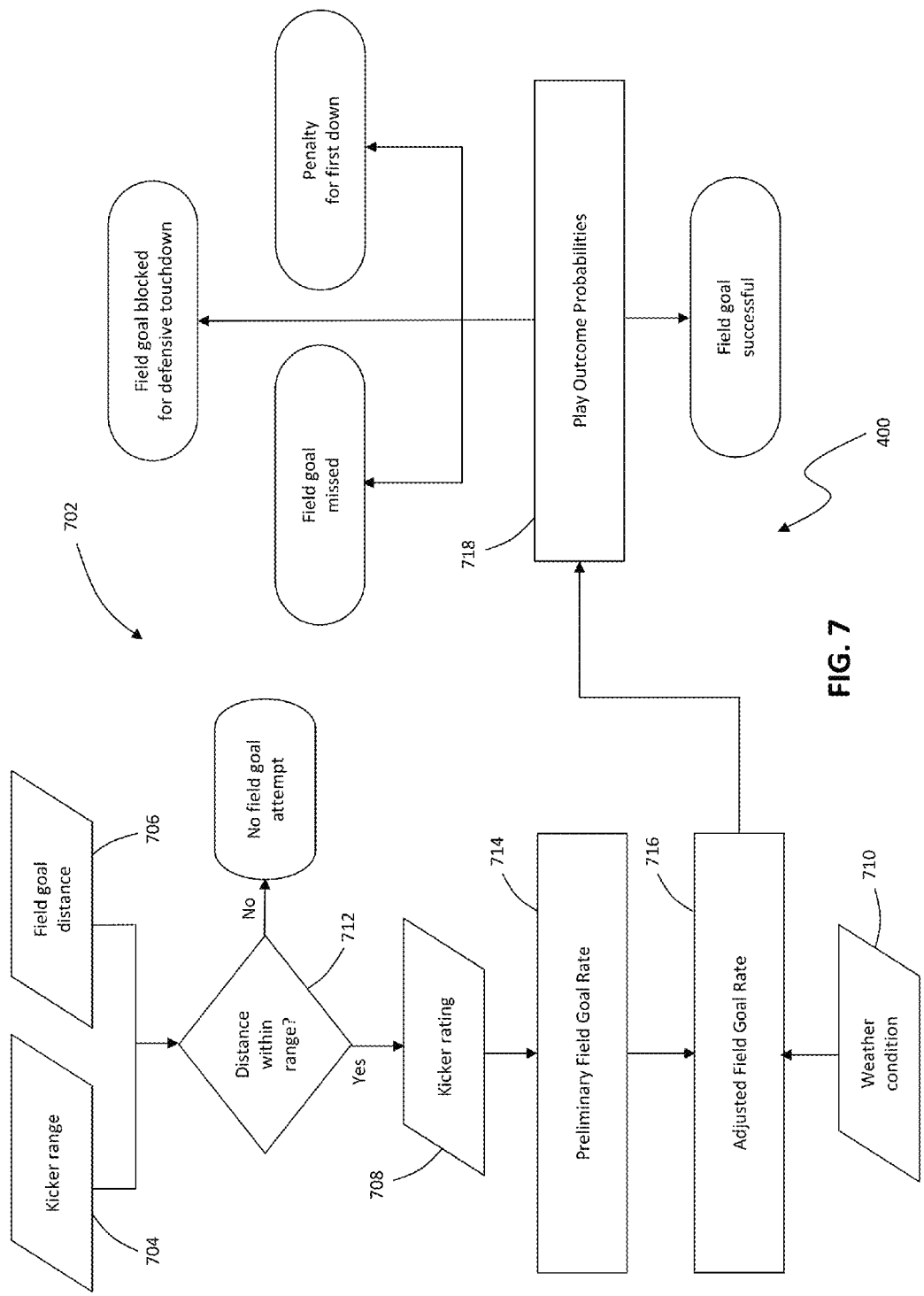
FIG. 7 is a flow chart of a Field Goal algorithm of the fourth down module.

As shown in FIG. 7, the Field Goal algorithm 702 determines the probability of each potential play outcome associated with the Field Goal coaching decision. The Field Goal algorithm 702 receives a kicker range input at block 704, a field goal distance input at block 706, a kicker quality rating input at block 708, and a weather condition input at block 710. Exemplary weather categories are set forth in Error! Reference source not found. below.

TABLE 4

| Weather Category | Weather Conditions |
| --- | --- |
| High Wind Outside (HWO) | Wind of 15+ mph |
| High Wind Precipitation (HWP) | Wind of 15+ mph with rain or snow |
| Indoors | Roofed or domed stadium |
| Low Wind Outside (LWO) | Wind of 0-5 mph |
| Low Wind Precipitation (LWP) | Wind of 0-5 mph with rain or snow |
| Medium Wind Outside (MWO) | Wind of 6-14 mph |
| Medium Wind Precipitation (MWP) | Wind of 6-14 mph with rain or snow |

Range:

The kicker's range from block 704 may reflect the maximum distance from which the kicker is capable of making a field goal. This range may be provided by the coach of the team. In block 712, the Field Goal algorithm 702 determines whether the kick distance from block 706 is within the kicker's range. If the kick distance exceeds the kicker's range, the likelihood of making the field goal is set to 0%, which eliminates the Field Goal option in favor of the Go For It and Punt options. For example, if the kicker's range is 55 yards and the kick distance is 56 yards, the likelihood of making the field goal would be set to 0%.

Kicker Quality Rating:

The kicker quality rating may compare the team's kicker to an average kicker based on historical data. In certain embodiments, the kicker quality rating may be expressed as a percentage of field goals made relative to an average kicker with similar kicks (e.g., similar based on field position and weather). As an example, if an average kicker made 200 of 250 kicks and the team's kicker made 210 of 250 similar kicks (or 105%), the kicker quality rating would be 105%. In other embodiments, the kicker quality rating may be expressed on a scale of 1-10, where quality ratings of 1-4 may represent below-average performance, quality ratings of 5 may represent average performance, and quality ratings of 6-10 may represent above-average performance, for example. The team may choose to adjust the kicker quality rating if, for example, the kicker has been particularly good or bad in practice or is suffering from an injury.

Figure 8:
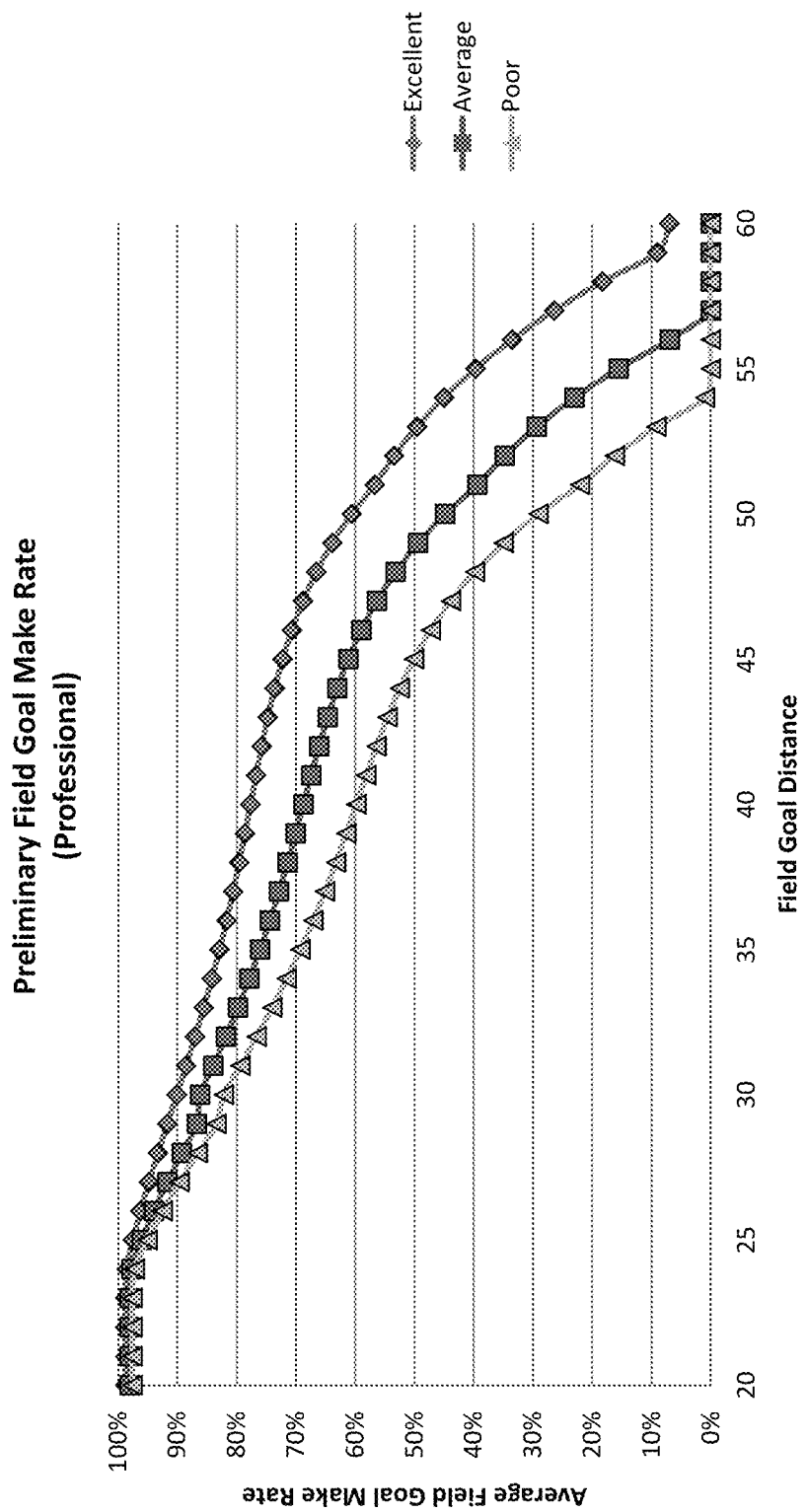
FIGS. 8 and 9 are graphs showing average field goal make rates.
Figure 9:
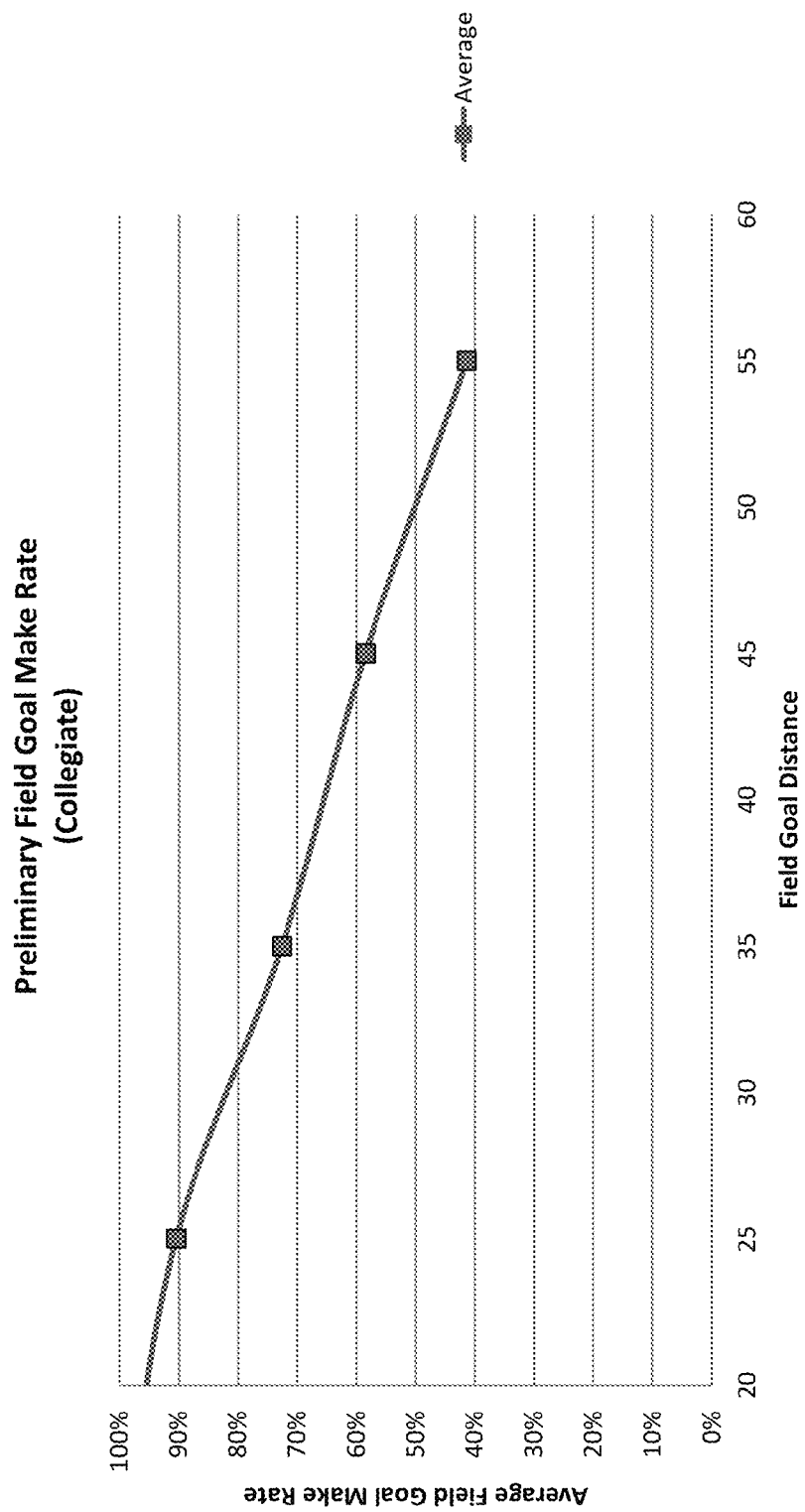

Preliminary Field Goal Make Rate:

At block 714, the Field Goal algorithm 702 uses the kicker quality rating from block 708 and the field goal distance from block 706 to determine a preliminary field goal make rate based on historical field goal data. Historical field goal data is shown in the form of charts in FIG. 8 for professional kickers and in FIG. 9 for collegiate kickers, where field goal distances are presented on the x-axis and average field goal make rates are presented on the y-axis. This historical field goal data shows that the likelihood of a successful field goal decreases as the field goal distance increases. Individual lines or equations (e.g., polynomial equations) may be presented to account for various kicker quality ratings. For simplicity, FIG. 8 shows three lines to account for an average professional kicker, an above-average or excellent professional kicker, and a below-average or poor professional kicker.

Figure 10:
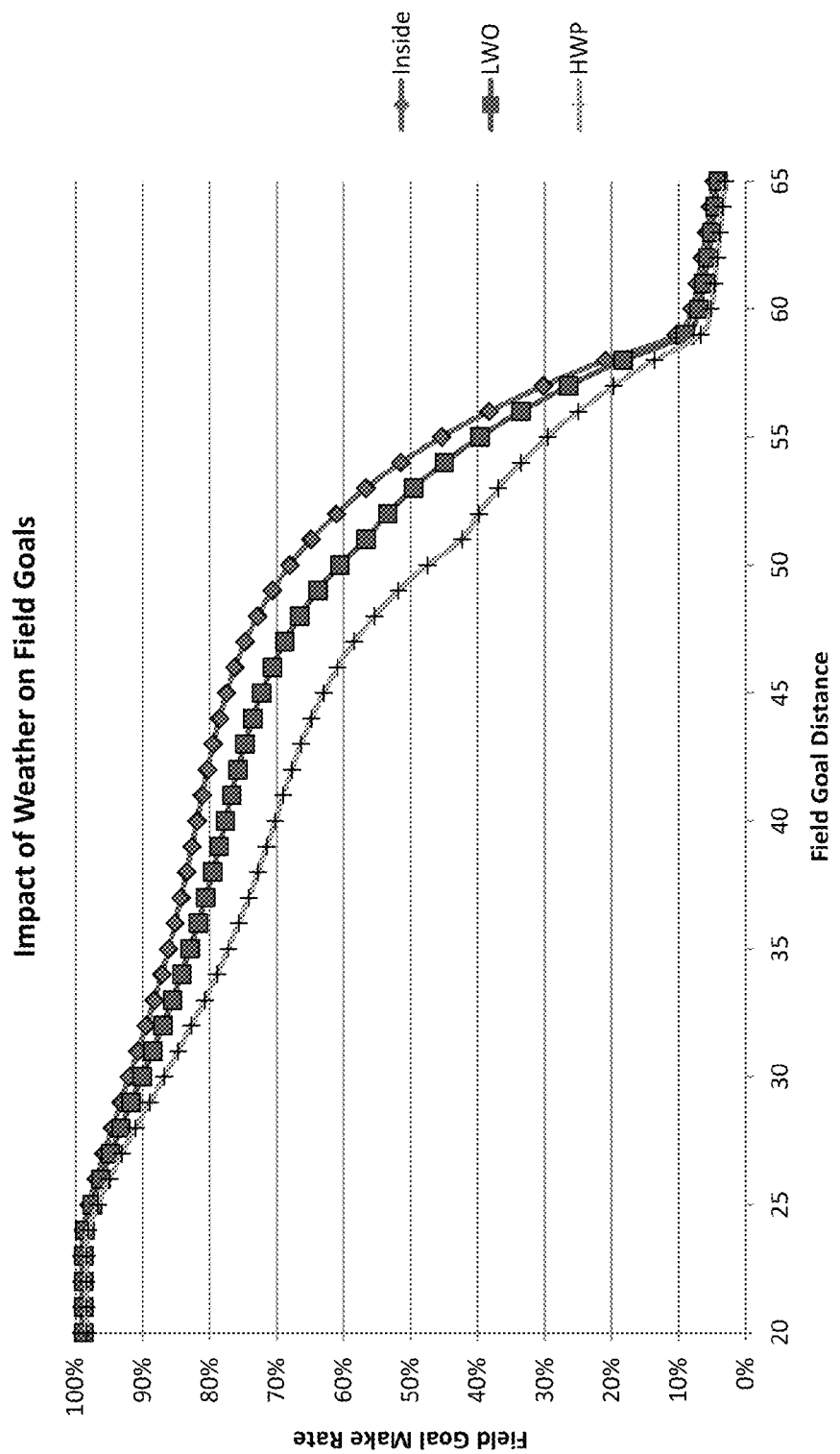
FIG. 10 is a graph showing the impact of weather on field goals.

Adjusted Field Goal Make Rate (Weather Multiplier):

As shown in FIG. 10, the weather plays a significant role in the success of field goals, especially at longer distances. For example, when the wind blows harder and when there is precipitation (HWP), the odds of a successful field goal decrease. At block 716, the Field Goal algorithm 702 may adjust the preliminary field goal make rate by multiplying the preliminary field goal rate by a corresponding weather multiplier based on the weather condition from block 710, as follows:

Adjusted Field Goal Make Rate=Preliminary Field Goal Make Rate*Weather Multiplier Defensive Touchdown:

The Field Goal algorithm 702 may calculate the probability of a blocked field goal for a defensive touchdown as a function of the field goal distance input from block 706. At short kick distances, this probability may be relatively low (e.g., 0.2%). At long kick distances, this probability may be relatively high (e.g., 1%).

Play Outcome Probabilities:

At block 718, the Field Goal algorithm 702 assigns probabilities to each potential field goal outcome, as set forth in Table 5 below.

TABLE 5

| Decision | Potential Play Outcomes | Probability |
| --- | --- | --- |
| Field Goal | 1. Field goal successful | Adjusted Field Goal Rate |
|  | 2. Field goal blocked for defensive touchdown | 0.2% (for short kick distances) 1% (for long kick distances) |

TABLE 5-continued

| Decision | Potential Play Outcomes | Probability |
| --- | --- | --- |
|  | 3. Penalty for first down | 1% (YTG ≤5) 0.5% (YTG >5) |
|  | 4. Field goal missed | Balance |
|  |  | 100% (Total) |

If additional potential play outcomes are identified, appropriate probabilities may be assigned to each additional play outcome with the missed field goal outcome accounting for the balance. Also, like the probability of the successful field goal outcome, the other probabilities may be adjusted based on team-specific considerations, such as the defense's propensity for penalties or the defense's field goal blocking ability. The Field Goal algorithm 702 may communicate these probabilities to the full game simulation module 1200 and/or the recommendation module 1700, both of which are discussed further below.

(C) Punt Algorithm

Figure 11:
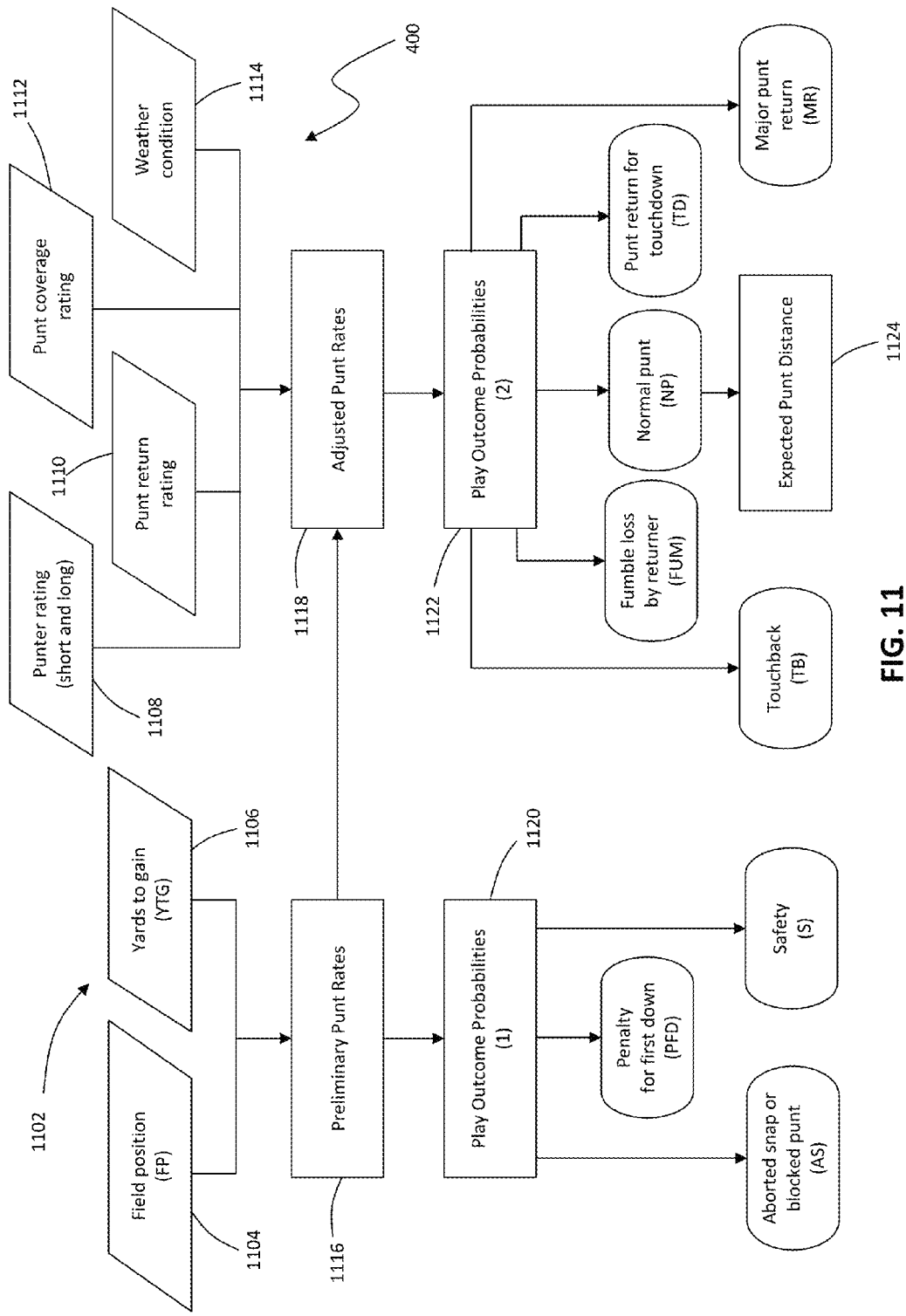
FIG. 11 is a flow chart of a Punt algorithm of the fourth down module.

As shown in FIG. 11, the Punt algorithm 1102 determines the probability of each potential play outcome associated with the Punt coaching decision on a fourth down play. The Punt algorithm 1102 of FIG. 11 receives a field position (FP) input at block 1104, a yards to gain (YTG) for first down distance at block 1106, a punter quality rating input for short kicks (which corresponds to field positions of 55 yards or more) and a punter quality rating input for long kicks (which corresponds to field positions less than 55 yards) at block 1108, a punt return quality rating input at block 1110, a punt coverage quality rating input at block 1112, and a weather condition input at block 1114.

Quality Ratings:

The punter, punt return, and punt coverage quality ratings may compare the particular player or group to an average player or group based on historical data. In addition to accepting punter, punt return, and punt coverage quality ratings, the Punt algorithm 1102 may also accept punt snapper quality ratings and other player-based or team-based quality ratings, for example. In certain embodiments, the quality ratings may be expressed as percentages relative to an average player or team. As an example, if an average punter gained 4,000 net yards on long punts and a particular punter gained 3,800 net yards (or 95%) on similar punts (e.g., similar based on field position and weather), the punter's quality rating may be 95%. In other embodiments, the quality ratings may be expressed on a scale of 1-10, where quality ratings of 1-4 may represent below-average performance, quality ratings of 5 may represent average performance, and quality ratings of 6-10 may represent above-average performance.

Preliminary Punt Rates:

At block 1116, the Punt algorithm 1102 uses the field position input from block 1104 to determine preliminary rates for each potential punt outcome. These preliminary punt rates may be based on historical data. Exemplary preliminary punt rates are presented in Table 6 below.

TABLE 6

| | | | | | | PFD | | | |
| --- | --- | --- | --- | --- | --- | --- | --- | --- | --- |
| FP | TB | FUM | AS | TD | MR | YTG > 5 | YTG ≤ 5 | S | NP |
| 5 | 0.00% | 1.42% | 0.00% | 1.09% | 0.95% | 0.13% | 0.73% | 0.82% | Balance |
| 10 | 0.00% | 1.49% | 0.00% | 1.13% | 0.99% | 0.13% | 0.73% | 0.64% | Balance |

TABLE 6-continued

| | | | | | PFD | | | |
|---|---|---|---|---|---|---|---|---|
| FP | TB | FUM | AS | TD | MR | YTG > 5 | YTG ≤ 5 | S | NP |
| 15 | 0.00% | 1.50% | 0.15% | 0.95% | 1.28% | 0.13% | 0.73% | 0.44% | Balance |
| 20 | 0.00% | 1.53% | 0.15% | 0.96% | 1.30% | 0.13% | 0.73% | 0.26% | Balance |
| 25 | 0.15% | 1.51% | 0.15% | 0.92% | 1.35% | 0.13% | 0.73% | 0.16% | Balance |
| 30 | 1.13% | 1.44% | 0.15% | 1.02% | 1.49% | 0.13% | 0.73% | 0.06% | Balance |
| 35 | 4.30% | 1.34% | 0.15% | 0.93% | 1.89% | 0.13% | 0.73% | 0.00% | Balance |
| 40 | 8.85% | 1.10% | 0.15% | 0.86% | 1.74% | 0.13% | 0.73% | 0.00% | Balance |
| 45 | 14.36% | 0.82% | 0.15% | 0.57% | 1.69% | 0.23% | 1.26% | 0.00% | Balance |
| 50 | 20.14% | 0.68% | 0.15% | 0.45% | 1.34% | 0.28% | 1.53% | 0.00% | Balance |
| 55 | 25.20% | 0.56% | 0.15% | 0.21% | 1.10% | 0.26% | 1.45% | 0.00% | Balance |
| 60 | 28.27% | 0.49% | 0.15% | 0.13% | 0.89% | 0.19% | 1.03% | 0.00% | Balance |
| 65 | 28.61% | 0.42% | 0.15% | 0.10% | 0.71% | 0.13% | 0.69% | 0.00% | Balance |

According to Table 6 above, when a punter kicks from midfield (FP=50), for example, the historical likelihood of a touchback (TB) is 20.14%, a fumble by the kick returner (FUM) is 0.68%, an aborted snap (AS) is 0.15%, a punt return for a touchdown (TD) is 0.45%, a major punt return (MR) is 1.34%, a penalty for first down (PFD) is 0.28% if there are more than 5 YTG for the first down and 1.53% if there are 5 or less YTG, and a safety (S) is 0.00%. A normal punt (NP) would be expected to occur the remaining 76.96% of the time when there are more than 5 YTG for the first down and 75.71% of the time when there are 5 or less YTG.

The preliminary punt rates in Table 6 above illustrate various trends. For example, when a team is punting close to its own goal line (low FP), the likelihood of a touchback (TB) is relatively low and the likelihood of a safety (S) is relatively high. Also, the return team is more likely to attempt a return for yardage, so the likelihood of a return for touchdown (TD) or a major return (MR), as well as the likelihood of a fumbled return (FUM), are relatively high.

When the team is close enough to the opponent's goal line, in this case the opponent's 35 yard line (FP=65), the probability of a normal punt (NP) may be set to 0% to eliminate the Punt option in favor of the Go For It and Field Goal options.

Adjusted TD Rate and Adjusted MR Rate:

At block 1118, the Punt algorithm 1102 may adjust the preliminary TD rate and the preliminary MR rate from Table 6 above based on the quality of the punt returner versus the quality of the punt coverage team. For example, the Punt algorithm 1102 may multiply each of the preliminary TD and MR rates by a TD/MR punt return multiplier based on the punt return quality rating from block 1110 and a TD/MR punt coverage multiplier based on the punt coverage quality rating from block 1112, as follows:

Adjusted TD Rate=Preliminary TD Rate*TD Punt Return Multiplier*TD Punt Coverage Multiplier Adjusted MR Rate=Preliminary MR Rate*MR Punt Return Multiplier*MR Punt Coverage Multiplier Exemplary TD/MR punt return multipliers and TD/MR punt coverage multipliers are presented in Table 7 below. However, these multipliers may be adjusted to account for extreme punt team mismatch scenarios.

TABLE 7

| Punt Return | | Punt Coverage | |
|---|---|---|---|
| Rating | TD/MR Multiplier | Rating | TD/MR Multiplier |
| 10 | 125% | 10 | 125% |
| 9 | 120% | 9 | 120% |

TABLE 7-continued

| Punt Return | | Punt Coverage | |
|---|---|---|---|
| Rating | TD/MR Multiplier | Rating | TD/MR Multiplier |
| 8 | 115% | 8 | 115% |
| 7 | 110% | 7 | 110% |
| 6 | 105% | 6 | 105% |
| 5 | 100% | 5 | 100% |
| 4 | 95% | 4 | 95% |
| 3 | 90% | 3 | 90% |
| 2 | 85% | 2 | 85% |
| 1 | 80% | 1 | 80% |

As an example, if the punter kicks the ball from midfield (FP=50), the preliminary TD rate from Table 6 above would be 0.45%, and the preliminary MR rate from Table 6 above would be 1.34%. If the punt returner is considered good and assigned a quality rating of 8 (115% multiplier) and the punt coverage team is considered poor and assigned a quality rating of 2 (85% multiplier), the adjusted TD rate would increase to 0.62% (calculated as 0.45% (preliminary TD rate)*115% (punt return multiplier)*85% (punt coverage multiplier), and the adjusted MR rate would increase to 1.85% (calculated as 1.34% (preliminary MR rate)*115% (punt return multiplier)*85% (punt coverage multiplier)).

Adjusted FUM Rate:

At block 1118, the Punt algorithm 1102 may also adjust the preliminary FUM rate from Table 6 above based on the quality of the punt returner and the weather. For example, the Punt algorithm 1102 may multiply the preliminary FUM rate by a FUM punt return multiplier based on the punt return quality rating from block 1110 and a FUM weather multiplier based on the weather condition from block 1114, as follows:

Adjusted FUM Rate=Preliminary FUM Rate*FUM Punt Return Multiplier*FUM Weather Multiplier Some punt returners are more likely to fumble than others. Exemplary FUM punt return multipliers are presented in Table 8 below. However, the FUM punt return multiplier may be increased or decreased, as appropriate, to reflect the opponent's specific propensity to fumble. The FUM punt return multiplier may be adjusted based on team input or historical data, especially for NFL punt returners where significant fumbling data may be available for each punt returner. For example, if an average punt returner fumbled 4 of 100 punts and a particular punt returner fumbled 6 of 100 punts (or 150%), the punt returner's specific FUM multiplier may be 150%.

TABLE 8

| Punt Return Quality Rating | FUM Multiplier |
|---|---|
| 10 | <100% |
| 9 | |
| 8 | |
| 7 | |
| 6 | |
| 5 | 100% |
| 4 | >100% |
| 3 | |
| 2 | |
| 1 | |

The weather also affects the likelihood of a fumble on a punt return. For example, when the wind blows harder and when there is precipitation, the odds of a fumble increase. Exemplary FUM weather multipliers are presented in Table 9 below.

TABLE 9

| Weather Category | FUM Weather Multipliers |
|---|---|
| High Wind Outside (HWO) | 136% |
| High Wind Precipitation (HWP) | 156% |
| Indoors | 94% |
| Low Wind Outside (LWO) | 94% |
| Low Wind Precipitation (LWP) | 110% |
| Medium Wind Outside (MWO) | 94% |
| Medium Wind Precipitation (MWP) | 110% |

Returning to the previous example, if the punter kicks the ball from midfield (FP=50), the preliminary FUM rate from Table 6 above would be 0.68%. If the punt returner is considered good and assigned a quality rating of 8 (75% multiplier), and the weather is characterized as Medium Wind Precipitation (MWP) (110% multiplier), the adjusted FUM rate would decrease to 0.56% (calculated as 0.68% (preliminary FUM rate)*75% (punt return multiplier)*110% (weather multiplier)).

Adjusted TB Rate:

At block 1118, the Punt algorithm 1102 may also adjust the preliminary TB rate from Table 6 above based on the ability of the punter on shorter kicks to punt the ball and keep it from going into the end zone for a touchback. For example, the Punt algorithm 1102 may multiply the preliminary TB rate by a TB punter multiplier based on the punter quality rating from block 1108, as follows:

Adjusted TB Rate=Preliminary TB Rate*TB Punter Multiplier

Exemplary TB punter multipliers are presented in Table 10 below. However, the TB punter multiplier may be increased or decreased, as appropriate, to reflect the punter's specific propensity to achieve a touchback. The TB punter multiplier may be adjusted based on team input or historical data, especially for NFL punters where significant touchback data may be available for each punter. For example, if an average punter achieved 20 touchbacks on 100 short punts and a particular punter achieved 25 touchbacks (or 125%) on 100 short punts, the punter's specific TB multiplier may be 125%.

TABLE 10

| Punter Quality Rating (short) | TB Punter Multiplier |
|---|---|
| 10 | 95% |
| 9 | 98% |

TABLE 10-continued

| Punter Quality Rating (short) | TB Punter Multiplier |
|---|---|
| 8 | 100% |
| 7 | 102% |
| 6 | 105% |
| 5 | 110% |
| 4 | 115% |
| 3 | 120% |
| 2 | 125% |
| 1 | 130% |

The weather may also affect the likelihood of a touchback on a punt return. Therefore, it is also within the scope of the present disclosure for the Punt algorithm 1102 to multiply the preliminary TB rate by a TB weather multiplier based on the weather condition from block 1114.

Play Outcome Probabilities:

At blocks 1120 and 1122, the Punt algorithm 1102 assigns probabilities to each potential punt outcome, as set forth in Table 11 below.

TABLE 11

| Decision | Potential Play Outcomes | Probability |
|---|---|---|
| Punt | 1. Touchback (TB) | Adjusted TB Rate |
| | 2. Fumble loss by punt returner (FUM) | Adjusted FUM Rate |
| | 3. Aborted snap or blocked punt (AS) | Preliminary AS Rate |
| | 4. Punt return for defensive touchdown (TD) | Adjusted TD Rate |
| | 5. Major punt return for 25+ yards but no touchdown (MR) | Adjusted MR Rate |
| | 6. Penalty for first down (FD) | Preliminary FD Rate |
| | 7. Safety (S) | Preliminary S Rate |
| | 8. Normal punt and return (NP) | Balance |
| | | 100% (Total) |

It is also within the scope of the present disclosure to adjust the preliminary AS, FD, and S rates based on team-specific considerations. The Punt algorithm 1102 may communicate these probabilities to the full game simulation module 1200 and/or the recommendation module 1700, both of which are discussed further below.

Expected Yardage from Normal Punt:

The Punt algorithm 1102 may determine not only the likelihood of a normal punt at block 1122, but also the expected yardage from that punt at block 1124. The Punt algorithm 1102 may use the field position input from block 1104 to determine a preliminary punt yardage based on historical data. Exemplary preliminary punt yardages are presented in Table 12 below.

TABLE 12

| FP | Preliminary Punt Yardage |
|---|---|
| 5 | 40.05 |
| 10 | 40.47 |
| 15 | 40.68 |
| 20 | 40.72 |
| 25 | 40.6 |
| 30 | 40.29 |
| 35 | 39.76 |
| 40 | 38.93 |
| 45 | 37.7 |
| 50 | 35.96 |
| 55 | 33.56 |

TABLE 12-continued

| FP | Preliminary Punt Yardage |
|---|---|
| 60 | 30.32 |
| 65 | 26.04 |

The Punt algorithm 1102 may adjust the preliminary punt yardage from Table 12 above based on the quality of the punter and the weather. For example, the Punt algorithm 1102 may multiply the preliminary punt yardage by a punter multiplier based on the punter quality rating from block 1108 and a weather multiplier based on the weather condition from block 1114, as follows:

Expected Yardage=Preliminary Yardage*Punter Multiplier*Weather Multiplier

In embodiments where the punter quality rating from block 1108 represents the punter's yardage relative to average historical yardages (e.g., 95%), the Punt algorithm 1102 may use the punter quality rating directly as the punter multiplier. In other embodiments, the Punt algorithm 1102 may associate a suitable punter multiplier with the punter quality rating. Exemplary punter multipliers for collegiate punters, in particular, are set forth in Table 13 below.

TABLE 13

| Punter Quality Rating | Yardage Punter Multiplier |
|---|---|
| 10 | 101.0% |
| 9 | 99.0% |
| 8 | 97.0% |
| 7 | 95.0% |
| 6 | 93.5% |
| 5 | 92.0% |
| 4 | 90.5% |
| 3 | 89.0% |
| 2 | 87.5% |
| 1 | 86.0% |

Exemplary weather multipliers are set forth in Table 14 below.

TABLE 14

| | Yardage Weather Multipliers | |
|---|---|---|
| Weather Category | Shorter Punts (FP ≥55) | Longer Punts (FP <55) |
| High Wind Outside (HWO) | 98.1% | 96.7% |
| High Wind Precipitation (HWP) | 96.7% | 95.2% |
| Indoors | 104.9% | 103.3% |
| Low Wind Outside (LWO) | 102.2% | 100.6% |
| Low Wind Precipitation (LWP) | 99.5% | 98.1% |
| Medium Wind Outside (MWO) | 100.9% | 99.3% |
| Medium Wind Precipitation (MWP) | 99.1% | 97.6% |

As an example, if a professional punter kicks the ball from midfield (FP=50), the preliminary punt yardage from Table 12 above would be 30.96. If the punter quality rating is 95% (95% multiplier) and the weather is characterized as Low Wind Precipitation (LWP) (98.1% multiplier for longer punts), the expected punt yardage would decrease to 28.85 (calculated as 30.96 (preliminary punt yardage)*95% (punter multiplier)*98.1% (weather multiplier)).

The Punt algorithm 1102 may communicate the expected punt yardage for the normal punt outcome to the full game simulation module 1200, which is discussed further below. To create a realistic view of the expected yardage, the Punt algorithm 1102 may create a normal distribution around the expected punt yardage and other average yardages that are communicated to the full game simulation module 1200. For example, if the expected punt yardage is 35 yards, the Punt algorithm 1102 may communicate punt yardages normally distributed around and averaging 35 yards to the full game simulation module 1200.

Extra Point Module

Returning to FIG. 2, the extra point module 450 determines the probability of each potential play outcome for each coaching decision associated with an extra point play. Exemplary coaching decisions and corresponding potential play outcomes for an extra point play are shown in Table 15 below.

TABLE 15

| Decision | Potential Play Outcomes |
|---|---|
| 1 Point XP | 1. Kick successful |
| | 2. Kick missed |
| 2 Point XP | 1. Conversion successful into end zone |
| | 2. Conversion not successful |

The extra point module 450 determines the probability of each potential play outcome associated with the 1 Point XP coaching decision and each potential play outcome associated with the 2 Point XP coaching decision. The probability of making the 1 point XP may be the same as the probability of making a 20-yard field goal using the Field Goal algorithm 702 (FIG. 7). This analysis may take into account the kicker rating and the weather, as discussed above. The probability of making the 2 point XP may be the same as the probability of converting a fourth-and-goal from the opponent's 2-yard line using the Go For It algorithm 402 (FIG. 4). This analysis may take into account the team's estimated points (EP) and the field position multiplier used for Red Zone plays, as discussed above.

The probability of successfully converting the 1 Point XP or the 2 Point XP may remain constant throughout the game. However, the Win Probabilities associated with each coaching decision may vary depending on the score differential following the touchdown and the time remaining in the game, for example. The extra point module 450 may communicate these probabilities to the full game simulation module 1200 and/or the recommendation module 1700, both of which are discussed further below.

Full Game Simulation Module

Figure 12:
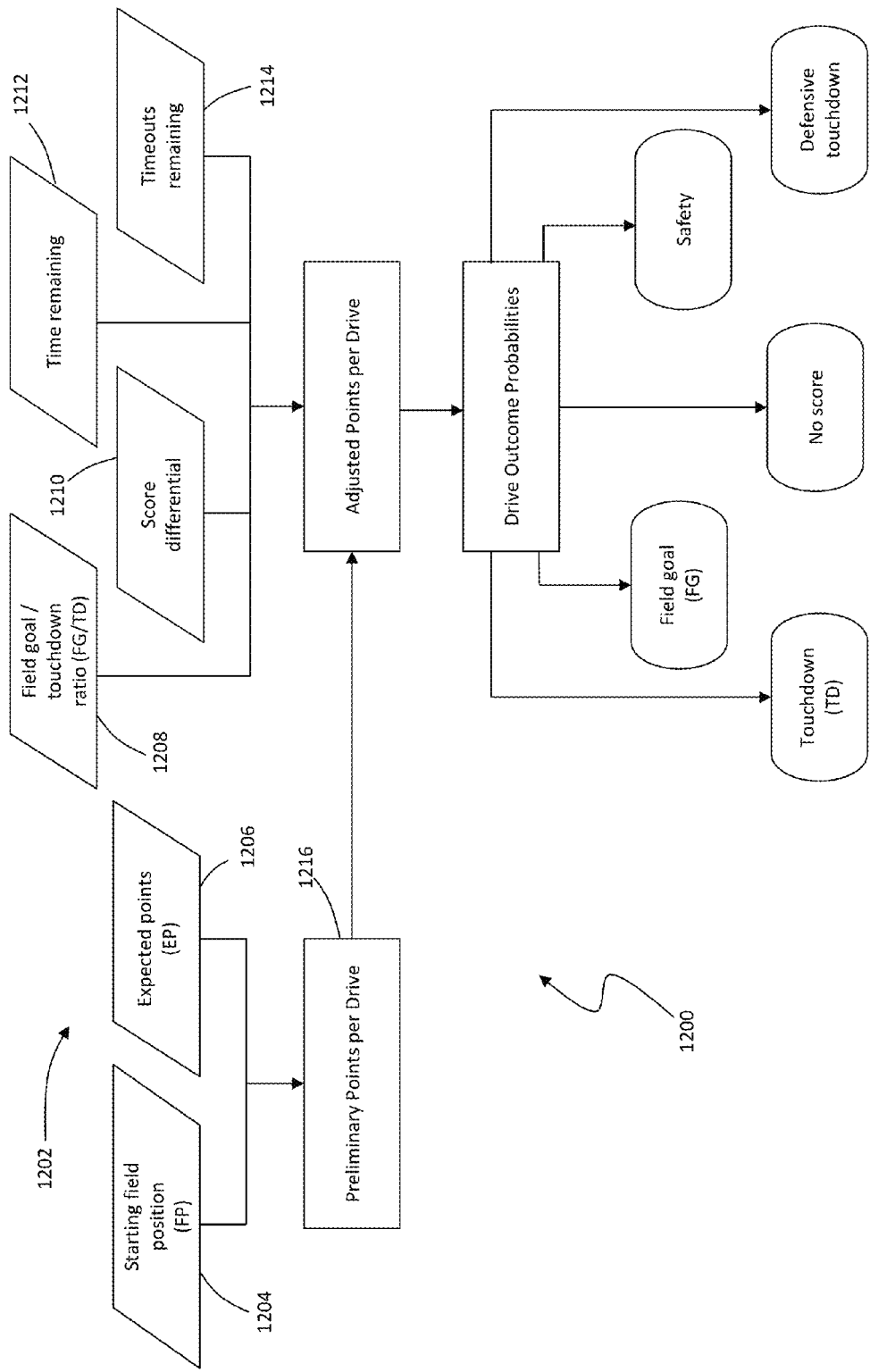
FIG. 12 is a flow chart of a points scored algorithm of the simulation module.

Referring next to FIG. 12, the full game simulation module 1200 simulates the remainder of the game based on each possible coaching decision and corresponding potential play outcome from the fourth down module 400 or the extra point module 450, as appropriate. The simulation module 1200 may run hundreds or thousands of times for each potential play outcome, with each run simulating the remainder of one game. Each run may be simulated on a drive-by-drive basis until time expires in the simulated game. For each run, the simulation module 1200 determines a winner of the simulated game and tabulates the win/loss result of the simulated game.

To illustrate, consider a fourth down play in the first quarter of a game. The coach's three decisions (Go For It, Field Goal, and Punt) are set forth in Table 1 above. The coach's decision can alter the outcome of the game, but because there may still be 10-12 possessions remaining for each team that will also affect the outcome of the game, the difference among the three decisions in terms of odds of winning the game may be small. By running the simulation module 1200 thousands of times, it may be possible to determine that one choice provides a slight (e.g., 0.5%) chance of winning the game over another option.

Referring back to FIG. 2, the simulation module 1200 may include a random number algorithm 1201, a points scored algorithm 1202, a field position algorithm 1402, and a time of drive algorithm 1602. These algorithms 1201, 1202, 1402, 1602 are discussed further below.

(A) Random Number Algorithm

Referring still to FIG. 2, the simulation module 1200 may operate based on predetermined probabilities using the random number algorithm 1201. The random number algorithm 1201 may receive a plurality of predetermined probabilities from the fourth down module 400, the extra point module 450, stored data records 206, the user interface 212, or another source, for example. The random number algorithm 1201 may ensure that each simulated event happens based on its predetermined probability. Such events include particular play outcomes and the score, time used, and resulting field position of subsequent drives.

In the context of a Field Goal coaching decision, for example, the random number algorithm 1201 may receive a predetermined probability of 51% corresponding to a successful field goal from the fourth down module 400. Based on this predetermined probability of 51%, the random number algorithm 1201 will generate a number set for use by a random number generator (RNG), where 51% of the numbers in the set correspond with a made field goal. The other 49% of the numbers in the set will correspond with other potential play outcomes from the Field Goal coaching decision, such as a missed field goal, a blocked field goal for a defensive touchdown, and a penalty for first down (See Table 1 above). When the RNG randomly selects one of the numbers from the set, the selected number will correspond with a made field goal about 51% of the time and with another play outcome about 49% of the time, especially over the course of thousands of simulations. Therefore, the random number algorithm 1201 will cause the simulation module 1200 to simulate a made field goal about 51% of the time and other play outcomes about 49% of the time.

In other embodiments, the predetermined probability of an event may be taken into account after simulation. For example, the outcome of a simulated event may be weighted by the predetermined probability of that event.

(B) Points Scored Algorithm

As shown in FIG. 12, the points scored algorithm 1202 determines the number of points that each team is expected to score on each simulated drive. The points scored algorithm 1202 may receive a starting field position (FP) input at block 1204, an expected points (EP) input at block 1206, a field goal to touchdown ratio (FG/TD) input at block 1208, a score differential input at block 1210, a time remaining input at block 1212, and a timeouts remaining input at block 1214. The potential drive outcomes and the corresponding points scored are set forth in Table 16 below.

TABLE 16

| Potential Drive Outcome | Points Scored |
| --- | --- |
| Offensive touchdown | 6 offensive points (before extra point play) |
| Offensive field goal | 3 offensive points |
| No score | 0 points |
| Safety | 2 defensive points |
| Defensive touchdown | 6 defensive points (before extra point play) |

Figure 13:
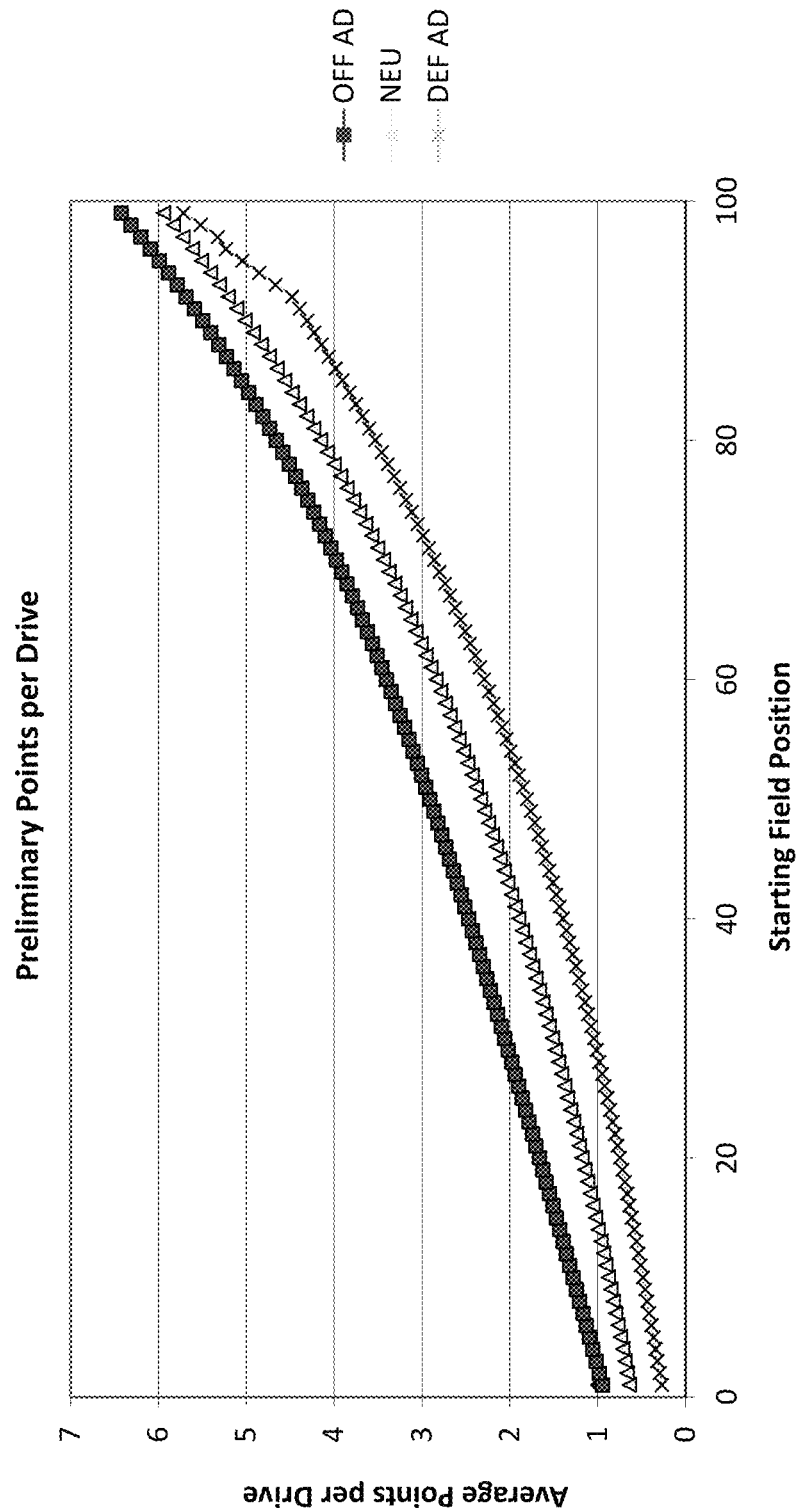
FIG. 13 is a graph showing average points per drive.

Preliminary Points Per Drive:

At block 1216, the points scored algorithm 1202 uses the starting FP from block 1204 and the EP value from block 1206 to determine the preliminary points per drive based on historical scoring data. Historical scoring data is shown in the form of a chart in FIG. 13, where the starting field position of the drive is presented on the x-axis (with 0 representing the team's own goal line and 100 representing the opponent's goal line) and average points scored are presented on the y-axis. FIG. 13 shows that the average points scored increases as the starting field position approaches the opponent's goal line. Individual lines may be presented to account for the EP value. For simplicity, FIG. 13 shows three lines to account for scenarios in which the offense and defense are an equal match with the same EP values (NEU), the offense has the advantage (OFF AD), and the defense has the advantage (DEF AD). Similar lines may be provided for every possible EP value.

Safety:

The points scored algorithm 1202 may use the starting FP from block 1204 and the EP value from block 1206 to determine the probability of a safety. As an example, if a drive starts on the team's own 1-yard line and the offense is overmatched by the defense, the probability of a safety may be 10%. By contrast, if the drive starts at the team's own 5-yard line and the offense is superior to the defense, the probability of a safety may be 1.5%.

Defensive Touchdown:

The points scored algorithm 1202 may use the EP value from block 1206, the score differential from block 1210, and the time remaining from block 1212 to determine the probability of a defensive touchdown. Dominant defenses will be more likely to score defensive touchdowns than poor defenses. It is also within the scope of the present disclosure to adjust the probability of a defensive touchdown based on team-specific considerations, such as if a defensive unit is particularly adept or poor at this area of the game.

The points scored algorithm 1202 may place special emphasis on defensive touchdowns in the fourth quarter. As a team falls behind in a game, particularly in the fourth quarter, the offense tends to be more aggressive. Though this aggressiveness may lead to more offensive points, this aggressiveness also increases the likelihood of a defensive touchdown, because the offense may throw a risky pass that could be intercepted for a touchdown, or the quarterback may be sacked for a fumble and touchdown as he holds on to the ball too long waiting for receivers to get open. Conversely, if the team is leading by a good margin, particularly in the fourth quarter, the offense tends to be conservative. Though the offense does not score as many points, it will turn the ball over infrequently as it will throw fewer risky passes that could be intercepted and running the ball more often. Plays of this type take away the opportunities for a defensive touchdown.

Offensive Touchdown, Field Goal, and No Score (FG/TD Ratio):

The points scored algorithm 1202 may use the FG/TD ratio from block 1208 to determine the remaining drive outcome probabilities. Especially for college teams, the rate at which field goals are kicked may vary tremendously from one team to the next. As a result, two teams may arrive at the same points per drive value in FIG. 13 in different ways. As an example, two teams may average 2.5 points per drive when starting from their own 40-yard line. However, as shown in Table 17 below, the teams may arrive at these points in different ways.

TABLE 17

| | Team A | Team B |
| --- | --- | --- |
| FG/TD Ratio | 1/1 | 4/1 |
| No Score (0 points) | 50% | 60% |
| TD (7 points) | 25% | 32% |

TABLE 17-continued

|  | Team A | Team B |
| --- | --- | --- |
| FG (3 points) | 25% | 8% |
| Points per Drive | 2.5 | 2.5 |

Adjusted Points Per Drive (End-of-Half Multipliers):

The points scored algorithm 1202 may adjust the amount of points expected to be scored on a particular drive at the end of each half. As discussed further below, this adjustment may be based on the starting FP of the drive from block 1204, the score differential from block 1210, the time remaining from block 1212, and the timeouts remaining from block 1214, for example.

First, the points scored algorithm 1202 may calculate a maximum number of plays remaining in the half or the game. The maximum number of plays remaining reflects the number of plays an offense would be able to run on that drive should it be running its offense at its fastest pace (e.g., two-minute drill). The maximum number of plays remaining may be a function of the time remaining from block 1212 and the offensive timeouts remaining from block 1214. As the maximum number of plays remaining drops, the opportunity for the offense to score diminishes. The points scored algorithm 1202 may also account for specific collegiate and professional timing rules. At the professional level, the clock will automatically stop with 2 minutes left to go in each half (i.e., the 2-minute warning). At the collegiate level, the clock automatically stops with each first down.

The points scored algorithm 1202 may also calculate a minimum number of plays remaining in the half or the game. The minimum number of plays reflects the number of plays an offense would have to run to kill the clock at the end of the half or the game should the offense be running at its slowest pace. The minimum number of plays remaining may be a function of the time remaining from block 1212 and the defensive timeouts remaining from block 1214. As an example, if there are 2 minutes left in the game and the opponent has no timeouts, the offense would have to run a minimum of 3 plays with each play taking 40 seconds off the clock, assuming that the clock continues to run between plays. As discussed above, these calculations may account for specific collegiate and professional timing rules.

At the end of the first half, when the maximum number of plays remaining drops below a certain threshold (e.g., 12 plays), the points scored algorithm 1202 may reduce the probability of scoring. The end-of-first-half scoring adjustment may be a function of the calculated maximum number of plays remaining and the starting FP of the drive from block 1204. As an example, if a team starts a drive from its own 20-yard line under normal conditions without time constraints, the probability of scoring on the drive may be 20%. At the end of the first half when the team only has 8 maximum plays remaining, the probability of scoring on the drive may be 75% of the normal drive. In this example, the probability of scoring would decrease to 15% (calculated as 20% (normal scoring probability)×75% (end-of-first-half multiplier)). If the end-of-half drive started forward at the opponent's 20-yard line rather than back at the team's own 20-yard line, for example, the limited number of plays remaining may not impact the scoring probability. In this example, the end-of-first-half multiplier may be 100% of the normal drive.

At the end of the second half (e.g., 12 minutes or less), the points scored algorithm 1202 may adjust the probability of scoring both a touchdown and a field goal. Separate scoring multipliers are provided for a touchdown and a field goal because the score differential may heavily influence whether a team attempts a touchdown for 7 points or a field goal for 3 points as the time winds down. As an example, if a team is behind by 6 points with just a few minutes remaining, it is highly unlikely that the team will end up kicking a field goal on that drive, because those points would not be valuable. Conversely, if a team is tied or down by 1 or 2 points late in the game, the field goal is a very likely outcome because the value of those 3 points is tremendous.

In total, the end-of-second-half scoring multipliers may be a function of the score differential from block 1210, the time remaining from block 1212, the calculated minimum and maximum number of plays remaining, and the starting FP of the drive from block 1204. Each of these factors is discussed further below.

The score differential impacts scoring at the end of the second half. When a team is trailing, the points scored algorithm 1202 may increase the probability of scoring, because the team may be more willing to go for it on fourth down and may be more aggressive on play-calling. This aggressive style may lead to more turnovers and better field position for the opponent if the drive fails, but those drives may also result in more points. As an example, if a team starts a drive from its own 20-yard line under normal conditions without time constraints, the probability of scoring a touchdown on the drive may be 20%. At the end of the second half when the team is down by 12 points, the probability of scoring a touchdown on the drive may be 115% of the normal drive. In this example, the probability of scoring a touchdown would increase to 23% (calculated as 20% (normal scoring probability)×115% (end-of-half multiplier)). These trends are reversed for teams that are ahead in a game. Therefore, when a team is leading, the points scored algorithm 1202 may decrease the probability of scoring, because the team may be conservative and reluctant to go for it on fourth down and may tend to call plays that are geared more toward avoiding turnovers and running off clock.

The time remaining and the number of plays remaining also impact scoring at the end of the second half. When a team is trailing, the points scored algorithm 1202 may consider the maximum number of plays remaining in the game, especially when the maximum number of plays remaining drops below a certain threshold (e.g., 12 plays). When a team is leading, the points scored algorithm 1202 may consider the minimum number of plays remaining in the game, especially when the minimum number of plays remaining drops below a certain threshold (e.g., 12 plays).

The starting FP also impacts scoring at the end of the second half. When a team starts a drive in its own territory, this factor may be less significant than other factors, such as score differential and whether a team is particularly aggressive or passive on that possession. When the team starts a drive deep in an opponent's territory, however, the points scored algorithm 1202 may increase the probability of scoring a touchdown, because teams will almost always pursue points when starting close to a touchdown.

Several exemplary end-of-second-half scoring multipliers are presented in Table 18 below. Additional multipliers may be developed for other game situations.

TABLE 18

| Score Differential | Minutes Remaining | Maximum Plays | Minimum Plays | Field Position | Touchdown Multiplier | Field Goal Multiplier |
|---|---|---|---|---|---|---|
| −10 | 8 | 12 | (n/a) | Own 20 | 118% | 105% |
| 10 | 8 | (n/a) | 12 | Own 20 | 90% | 85% |
| −7 | 2 | 10 | (n/a) | Own 30 | 125% | 0% |
| 7 | 2 | (n/a) | 6 | Own 30 | 20% | 40% |

(C) Field Position Algorithm

Figure 14:
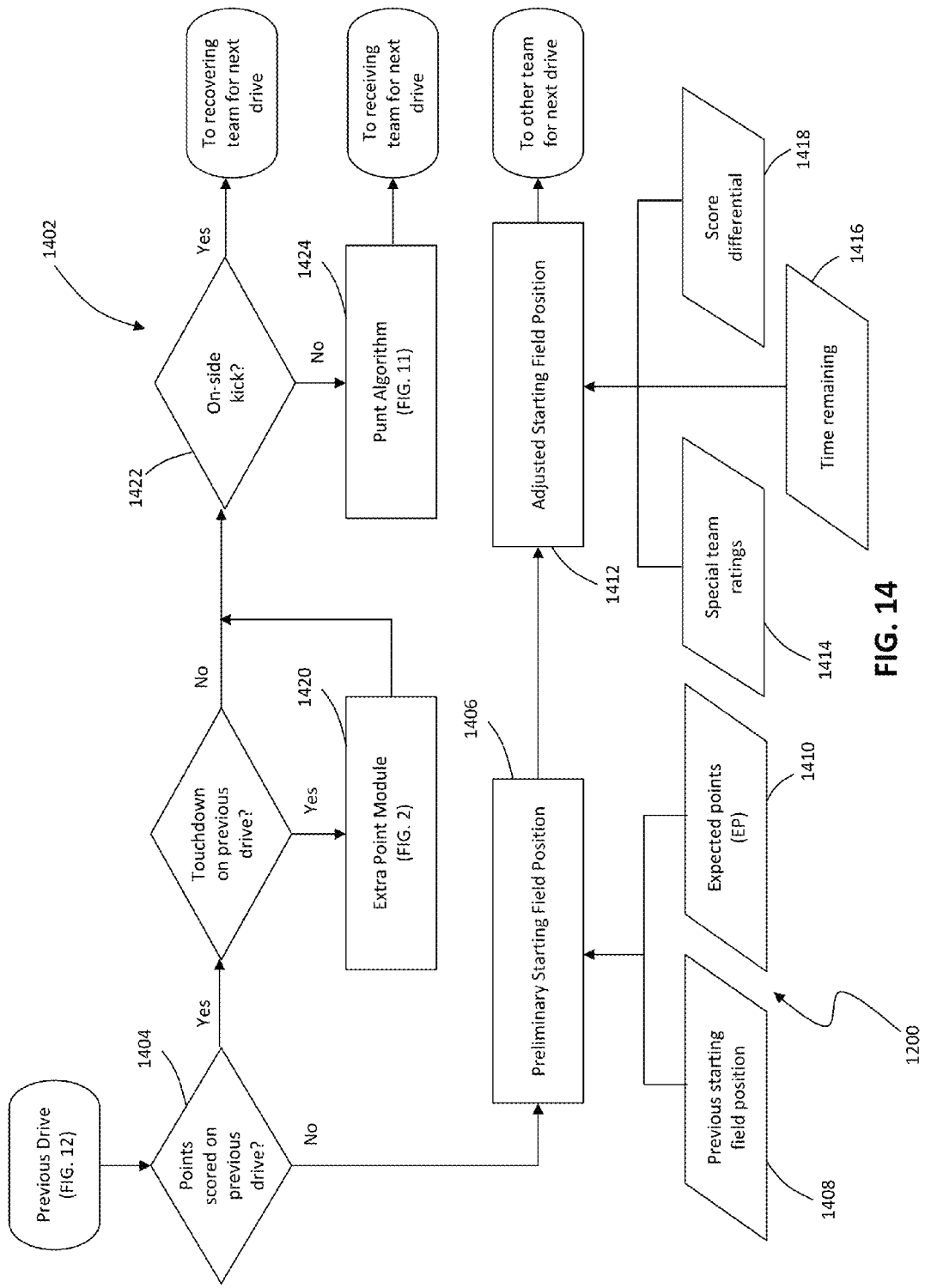
FIG. 14 is a flow chart of a field position algorithm of the simulation module.

As shown in FIG. 14, the field position algorithm 1402 determines the starting field position of the next simulated drive based on the outcome of the previous drive from the points scored algorithm 1202 (FIG. 12). At block 1404, the field position algorithm 1402 determines whether points were scored on the previous drive. If points were scored on the previous drive, the field position algorithm 1402 simulates a kickoff to start the next drive. If no points were scored on the previous drive, the field position algorithm 1402 performs a different analysis to simulate the starting field position of the next drive. Both scenarios are discussed below.

Figure 15:
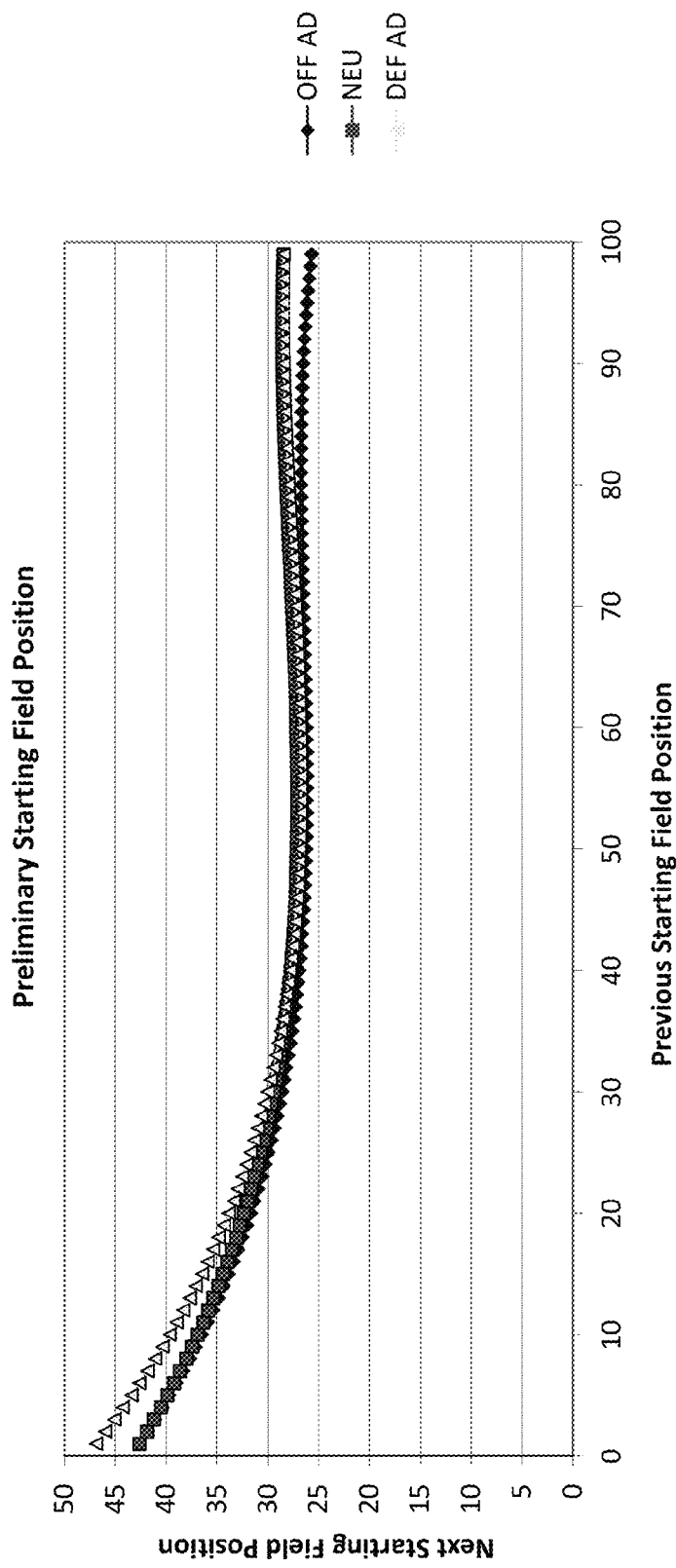
FIG. 15 is a graph showing average starting field position.

No Points Scored on Previous Drive—Preliminary Field Position:

At block 1406, following a drive that results in no score, the field position algorithm 1402 uses the starting field position of the previous drive from block 1408 and the expected points (EP) input from block 1410 to determine the preliminary starting field position of the next drive based on historical field position data. Historical field position data is shown in the form of a chart in FIG. 15. This historical data shows that, the closer the previous drive started to the opponent's own goal line (where x=0), the further the next drive will start from the team's goal line (where y=0). For example, if the opponent's previous drive started deep in the opponent's own territory (e.g., x=10), the next drive is more likely to start at a favorable field position near mid-field (e.g., y=about 40). By contrast, if the opponent's previous drive started in the team's territory far from the opponent's own goal line (e.g., x=60), the next drive is also more likely to start in the team's own territory (e.g., y=about 25). Individual lines or equations may be presented to account for various EP values. For simplicity, FIG. 15 shows three lines to account for scenarios in which the offense and defense are an equal match with the same EP values (NEU), the offense has the advantage (OFF AD), and the defense has the advantage (DEF AD). When a team's defense has the advantage, it is more likely to get good field position for its offense either through a turnover or a defensive stop that yields few yards before punting. Similar lines may be provided for specific EP values.

No Points Scored on Previous Drive—Adjusted Field Position:

At block 1412, the field position algorithm 1402 may adjust the starting field position of the next drive based on special team ratings from block 1414. In general, an above-average punting unit will be more likely to force its opponent to a deep field position than an average or below-average punting unit. The field position algorithm 1402 may also adjust the starting field position of the next drive based on the time remaining in the game from block 1416 and the score differential from block 1418. In general, if a team is behind, particularly late in the game (e.g., in the fourth quarter), it will become more aggressive on offense. Although an aggressive offense is more likely to score points, an aggressive offense also tends to give up field position when it does not score, because it is more likely to commit turnovers or turn the ball over on downs. Conversely, if a team is ahead, particularly late in the game, it will become more conservative on offense. A conservative offense tends to give its opponent poor field position, because it is less likely to commit turnovers. Based on the above factors, the field position algorithm X may assign a probability for the starting field position for every yard line on the field. The random number algorithm 1201 may be used to establish the actual starting field position for simulation.

Points Scored on Previous Drive—Extra Point:

If points were scored on the previous drive from a touchdown, the field position algorithm 1402 simulates an extra point following the touchdown at block 1420. The field position algorithm 1402 may simulate a 2 Point XP play when the scoring team is leading by 1, 4, 5, 11, 12, or 19 points or trailing by 2, 5, 10, 16, 17, or 18 points, for example. The field position algorithm 1402 may also simulate a 2 Point XP in other conditions, such as when simulating a high school team that rarely attempts a 1 Point XP. Otherwise, the field position algorithm 1402 may simulate a 1 Point XP play. The likelihood of making the 2 Point XP or the 1 Point XP may be calculated using the extra point module 405 (FIG. 2).

Points Scored on Previous Drive—on-Side Kick:

If points were scored on the previous drive, the field position algorithm 1402 simulates a kickoff to start the next drive. At block 1422, the field position algorithm 1402 may assume that the kicking team will try an on-side kick when the minimum plays remaining in the game is 6 or less and the kicking team is down by 8 points or less. The field position algorithm 1402 may also assume that the kicking team will try an on-side kick when the minimum plays remaining is 11 or less and the team is down by more than 8 points. The on-side kick may have a predetermined success rate (e.g., 13%) of recovery by the kicking team.

Points Scored on Previous Drive—Normal Kickoff:

If the field position algorithm 1402 does not simulate an on-side kick, the field position algorithm 1402 will simulate a normal kick at block 1424. The potential play outcomes from the kickoff are similar to the potential play outcomes from a punt, as shown in Table 11 above, so the kickoff analysis performed by the field position algorithm 1402 may be similar to the punt analysis performed by the Punt algorithm 1102 (FIG. 11). With respect to the touchback outcome, for example, the field position algorithm 1402 may evaluate the quality of the kicker and his propensity for achieving touchbacks. With respect to other kick outcomes, such as a normal return, a major return, a return for touchdown, or a fumble, the field position algorithm 1402 may evaluate a kick return quality rating and a kick coverage quality rating, for example.

Points Scored on Previous Drive—Long Kickoff:

If points were scored on the previous drive from a safety, the field position algorithm 1402 simulates a long kickoff from the 20-yard line (not the 35-yard line) to start the next drive. The field position algorithm 1402 may perform the same kickoff analysis as above, but may assume that a touchback is not possible and may advance the field position following the kickoff by 15 yards.

Overtime:

The logic employed by the field position algorithm 1402 may vary during overtime periods to accommodate specific overtime rules and the unique strategic situations that result. For example, if a professional team is down in overtime, the field position algorithm 1402 will eliminate punting as an option, so the team will be more likely to score than normal. As another example, if a professional or collegiate team can win the game with a field goal using a conservative approach, the field position algorithm 1402 will simulate a field goal more often than normal.

Instead of simulating the overtime period, the field position algorithm 1402 may calculate each team's probability of winning the overtime period based on the initial point spread, or more specifically the team's expected points (EP) divided by the total EP. For example, if the initial point spread is equal such that both teams are expected to score 25 points, both teams would have a 50% chance of winning the overtime period (calculated as 25 (team's EP)/50 (total EP)). By contrast, if one team is expected to score 30 points and the other team is only expected to score 20 points, the former team would have a 60% chance of winning the overtime period (calculated as 30 (team's EP)/50 (total EP)).

(D) Time of Drive Algorithm

Figure 16:
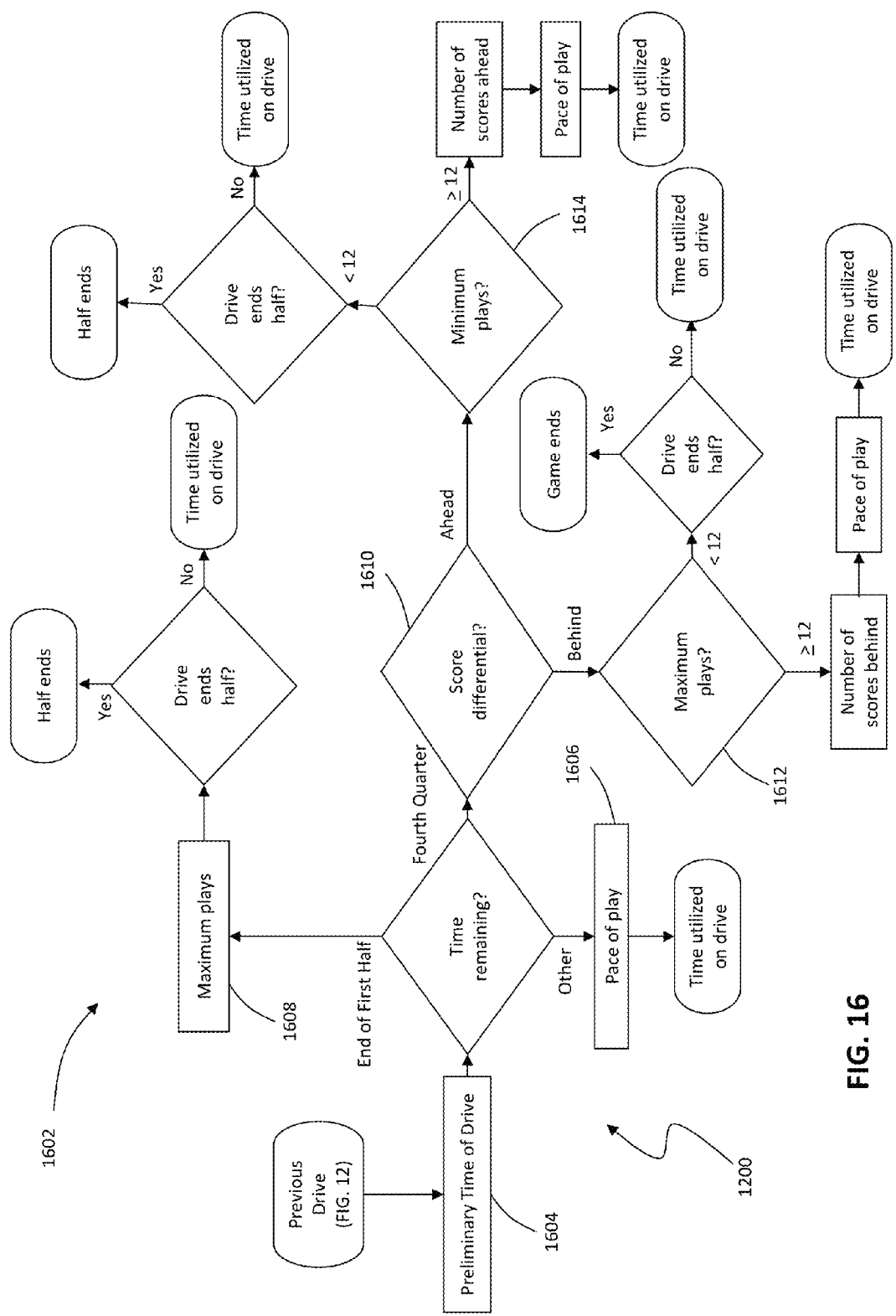
FIG. 16 is a flow chart of a time of drive algorithm of the simulation module.

As shown in FIG. 16, the time of drive algorithm 1602 determines the expected time of each simulated drive based on the starting field position of the drive and the outcome of the drive from the points scored algorithm 1202 (FIG. 12).

Preliminary Time of Drive:

At block 1604, the time of drive algorithm 1602 may estimate a preliminary time of drive based on historical data. In general, the preliminary time of drive may be higher for scoring drives than non-scoring drives. Also, the preliminary time of drive may increase as the distance of the drive increases based on the starting field position, for example.

Adjusted Time of Drive (Pace of Play Multiplier):

At block 1606, the time of drive algorithm 1602 may adjust the preliminary time of drive by a pace of play multiplier. The pace of play multiplier may compare the team's pace to an average team's pace based on historical data. For example, if an average team spends 2.5 minutes per drive and a particular team spends 2 minutes per drive (or 80%), that team's pace of play multiplier would be 80%.

A team's pace of play may vary depending on how much time the team takes between plays, the explosiveness of the offense, and the pass/run ratio of the offense. Pace of play may be especially significant at the collegiate level. Historically, collegiate teams such as Oregon and Baylor operate at a fast pace, because they hurry to start each play, have explosive offenses that can score in a few plays, and heavily lean on passing plays that take less time because incompletions stop the clock. Conversely, teams such as Navy or Georgia Tech operate at a slow pace, because they generally take their time between plays, run the ball most of the time, and thrive on scoring drives that take a large number of plays.

Timeouts:

For each simulated drive, the time of drive algorithm 1602 may determine the likelihood that a team will use one or more timeouts to stop the play clock. This analysis may be based on historical probabilities and other factors. In a normal drive without time constraints (i.e., not at the end of a half), the likelihood of utilizing a timeout may be about 10% for the offense and 5% for the defense. As the clock winds down toward the end of a half, timeout usage becomes more prevalent as teams seek to manipulate the clock to their advantage. As an example, if a defense is behind in a game with 3 timeouts remaining and less than 3 minutes to go, the team would likely use most or all of its timeouts in an effort to get the ball back. By contrast, if the defense is out of timeouts, the offense may not use its own timeouts in an effort to run off the remaining clock. Using a timeout will impact the calculated maximum and minimum number of plays remaining, as discussed above. Thus, the number of timeouts remaining will influence the likelihood that the drive will result in points, because more plays can be run in the time remaining with more available timeouts.

Adjusted Time of Drive (End-of-Half Timing):

The time of drive algorithm 1602 may also adjust the time of drive at the end of each half. The end-of-half timing considerations from this time of drive algorithm 1602 may be consistent with the end-of-half scoring considerations from the points scored algorithm 1202 (FIG. 12).

At the end of the first half (e.g., 5 minutes remaining), the time of drive algorithm 1602 may adjust the preliminary time of the drive based on the pace of play and the maximum plays available at block 1608. In general, as the first half comes to an end, teams may play at a faster pace in order to run more plays. Also, teams may use timeouts to stop the clock and conserve time to run more plays.

At the end of the second half (e.g., the fourth quarter), the time of drive algorithm 1602 may adjust the preliminary time of the drive based primarily on the score differential at block 1610. When a team is trailing, the time of drive algorithm 1602 may consider the maximum number of plays remaining in the game at block 1612. The trailing team may play at a faster pace as the fourth quarter progresses. The trailing team may also use any remaining timeouts to stop the clock and conserve time to run more plays. When a team is leading, the time of drive algorithm 1602 may consider the minimum number of plays remaining in the game at block 1614. The leading team may play at a slower pace and conserve timeouts to run out the clock.

Other Considerations:

The time of drive algorithm 1602 may also account for specific collegiate and professional timing rules. At the professional level, the clock will automatically stop with 2 minutes left to go in each half (i.e., the 2-minute warning). At the collegiate level, the clock automatically stops with each first down.

Time Expiration:

The time of drive algorithm 1602 may subtract the time utilized on the current drive from the time remaining. As long as there is time remaining, the simulation module 1200 may simulate the next drive. When the time remaining expires, the time of drive algorithm 1602 may signal an end of the half or the game.

Recommendation Module

As discussed further below, the recommendation module 1700 recommends a coaching decision having the highest Win Probability to the coach. Each Win Probability may be determined using the probability results from the fourth down module 400 or the extra point module 450 and the win/loss results from the simulation module 1200.

The recommendation may be made by generating a series of printed visual representations (e.g., charts) before the game based on potential scenarios that the coach may face during the game. Such charts may be especially useful for coaches that are unable to use computers to make in-game decisions. Such charts may be prepared by running multiple scenarios through the strategy program 210 (FIG. 2) before the game, as discussed further below. In other embodiments, the recommendation may be made by generating a real-time recommendation based on a particular scenario that the coach is facing during the game.

(A) Win Probability

For a coaching decision having n potential play outcomes, the Win Probability may be calculated by weighting the win probability of each simulated play outcome by the probability that the play outcome will occur, as follows:

$$\text{Win Probability} = (\text{Win Probability with Play Outcome} \times \text{Probability of Play Outcome})_{(1-n)}$$

The Win Probability may also be determined by incorporating the probability of each play outcome into the simulation module 1200, such as using the random number algorithm 1201 (FIG. 2). In this embodiment, the probability of each play outcome will be part of the simulation and need not be taken into account after the simulation.

(B) Fourth Down Recommendation

Figure 17:
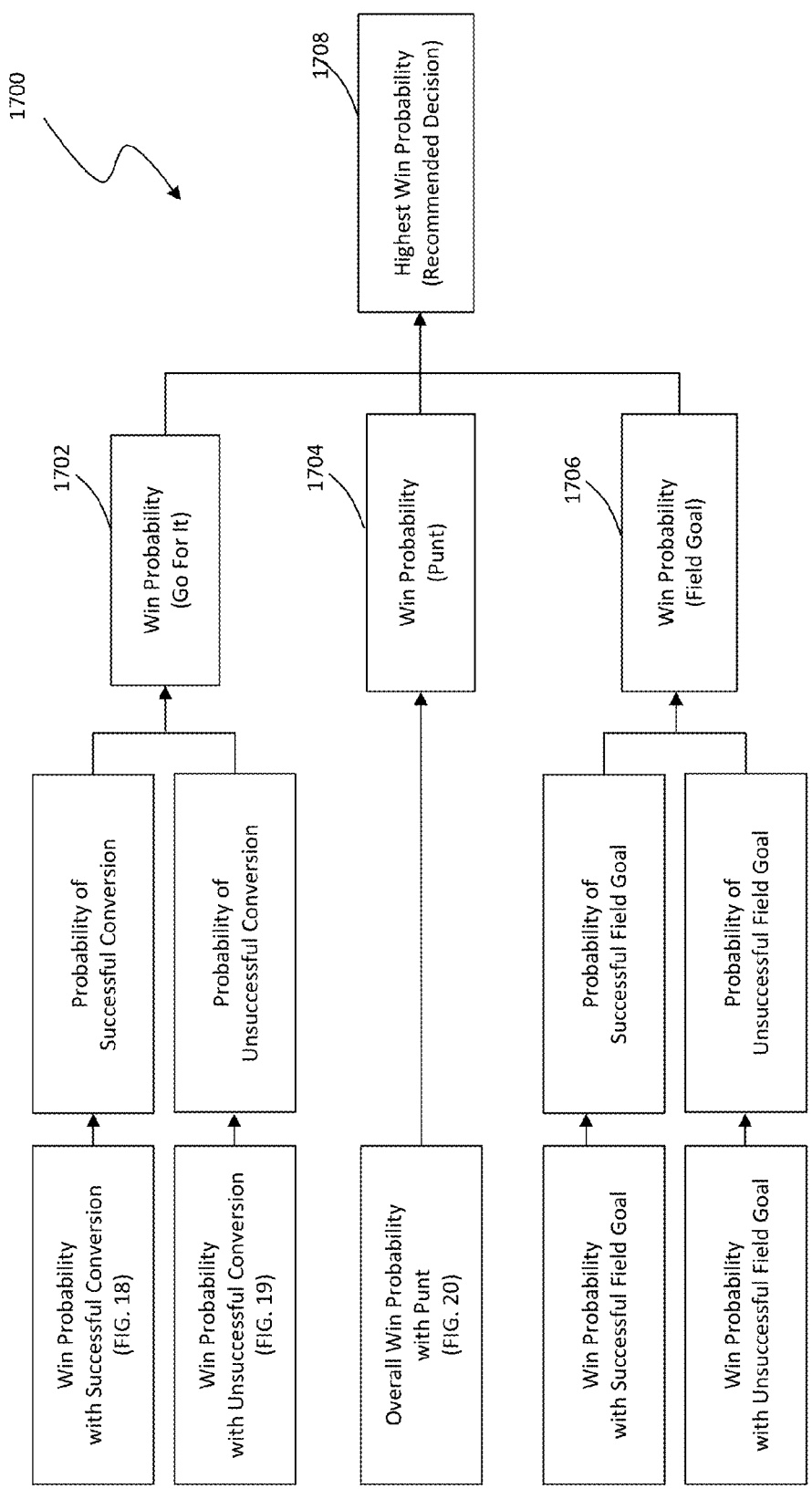
FIG. 17 is a flow chart of the recommendation module for a fourth down play.

As shown in FIG. 17, the recommendation module 1700 may determine a Win Probability for each fourth down coaching decision 1702, 1704, 1706 and recommend the coaching decision 1708 having the highest Win Probability to the coach. The Win Probabilities may be determined using the probability results from the fourth down module 400 and the win/loss results from the simulation module 1200.

Figure 18:
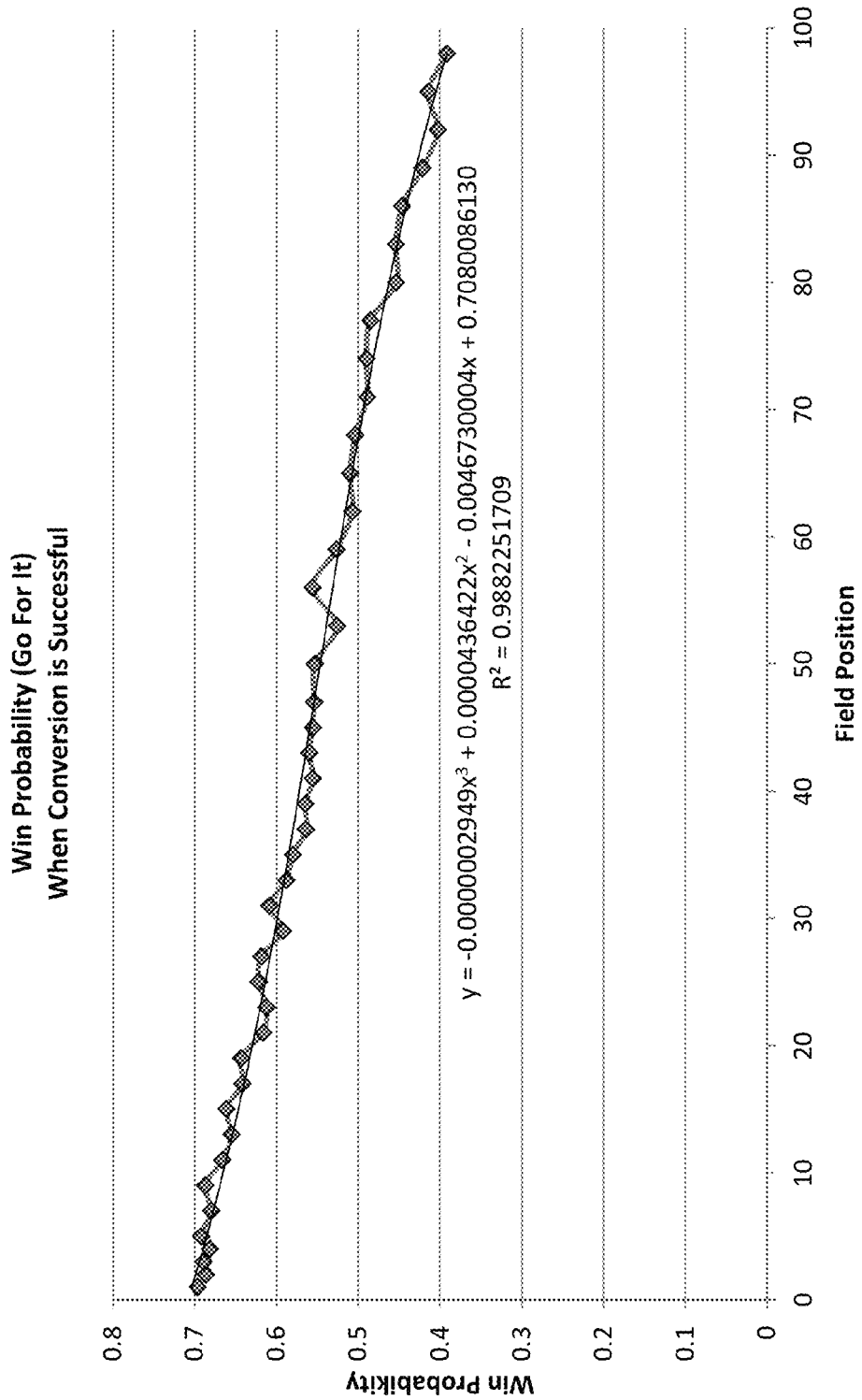
FIG. 18 is a graph and equation showing the win probability of a Go For It decision when the conversion is successful.
Figure 19:
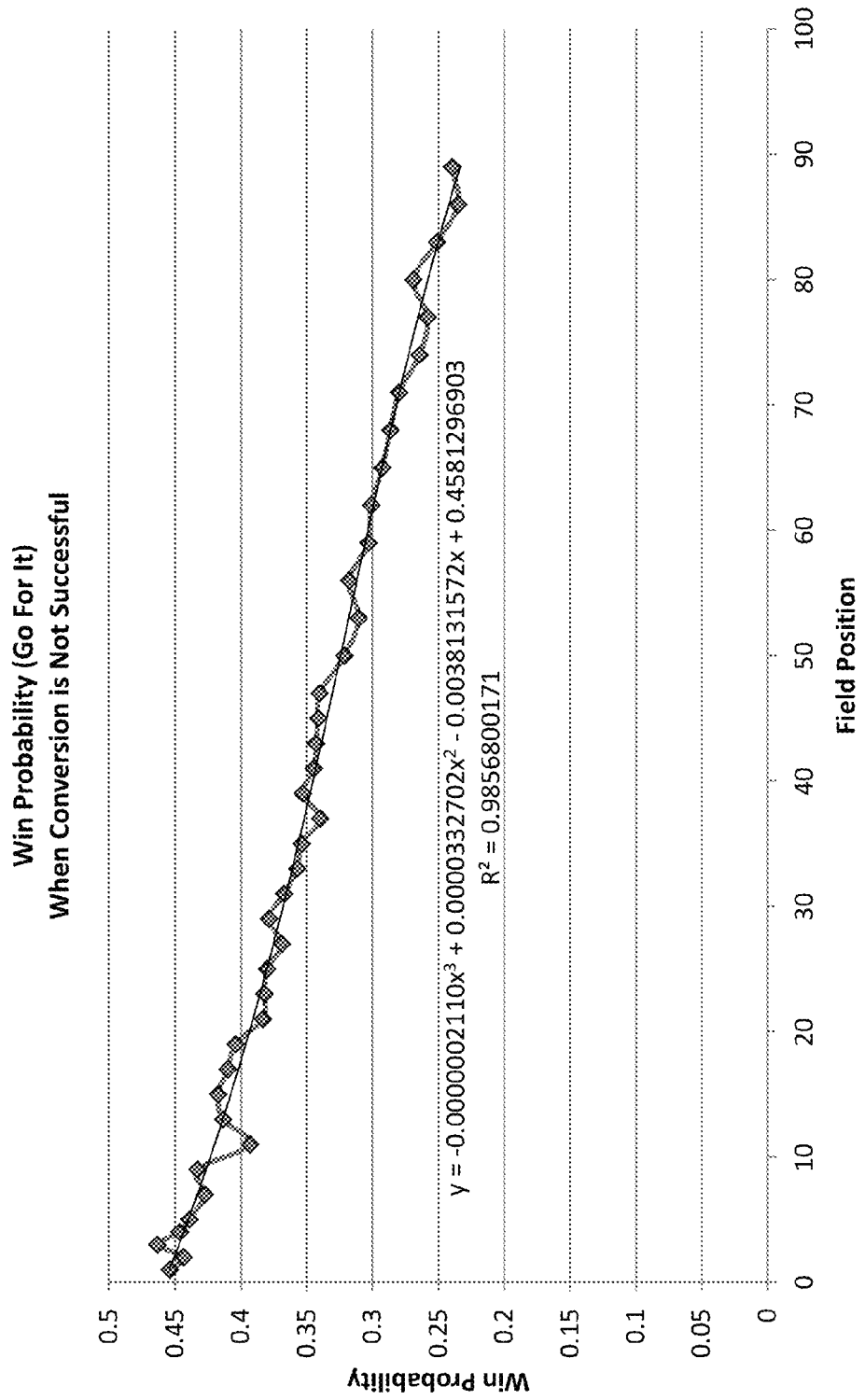
FIG. 19 is a graph and equation showing the win probability of a Go For It decision when the conversion is unsuccessful.

Win Probability (go for it):

FIG. 17 shows an exemplary method for calculating the Win Probability of the Go For It coaching decision 1702. For a given game scenario (e.g., matchup, score differential, time remaining), the Win Probability of each play outcome may be expressed as a function of field position. Specifically, the Win Probability of a successful conversion may be expressed as a function of field position, as shown in FIG. 18, and the Win Probability of an unsuccessful conversion may be expressed as a function of field position, as shown in FIG. 19, where field position is presented along the x-axis (with 0 representing the opponent's goal line and 100 representing the team's own goal line) and win probability is presented along the y-axis. The data points in FIGS. 18 and 19 represent the actual results from the simulation module 1200 at each field position. Best-fit equations may be produced to smooth and eliminate small noise in the data for subsequent use.

As an example, if a team is facing a fourth down play with 2 yards to go from the opponent's 2 yard line, the probability of a successful conversion may be 60% and the probability of an unsuccessful conversion may be 40%. Based on the data presented in FIG. 18, the win probability associated with the successful conversion from the opponent's 2 yard line would be about 70%. The 70% win probability means that the team is favored to win the game with the successful conversion. Based on the data presented in FIG. 19, the win probability associated with the unsuccessful conversion from the opponent's 2 yard line would be about 45%. The 45% win probability means that the team is not favored to win the game with the unsuccessful conversion. In this example, the overall win probability for the Go For It coaching decision would be 60% (calculated as 70% (win probability with successful conversion)×60% (probability of successful conversion)+45% (win probability with unsuccessful conversion)×40% (probability of unsuccessful conversion)).

By contrast, the team may face a fourth down play from the opponent's 4 yard line rather than the 2 yard line. In this example, the win probabilities from FIGS. 18 and 19 would be similar to the previous example. However, gaining 4 yards would be more difficult than gaining 2 yards, so the probability of a successful conversion would be lower than the previous example. For example, the probability of a successful conversion may be 40% and the probability of an unsuccessful conversion may be 60%. The overall win probability for the Go For It coaching decision would decrease to 55% (calculated as 70% (win probability with successful conversion)×40% (probability of successful conversion)+45% (win probability with unsuccessful conversion)×60% (probability of unsuccessful conversion)).

Figure 20:
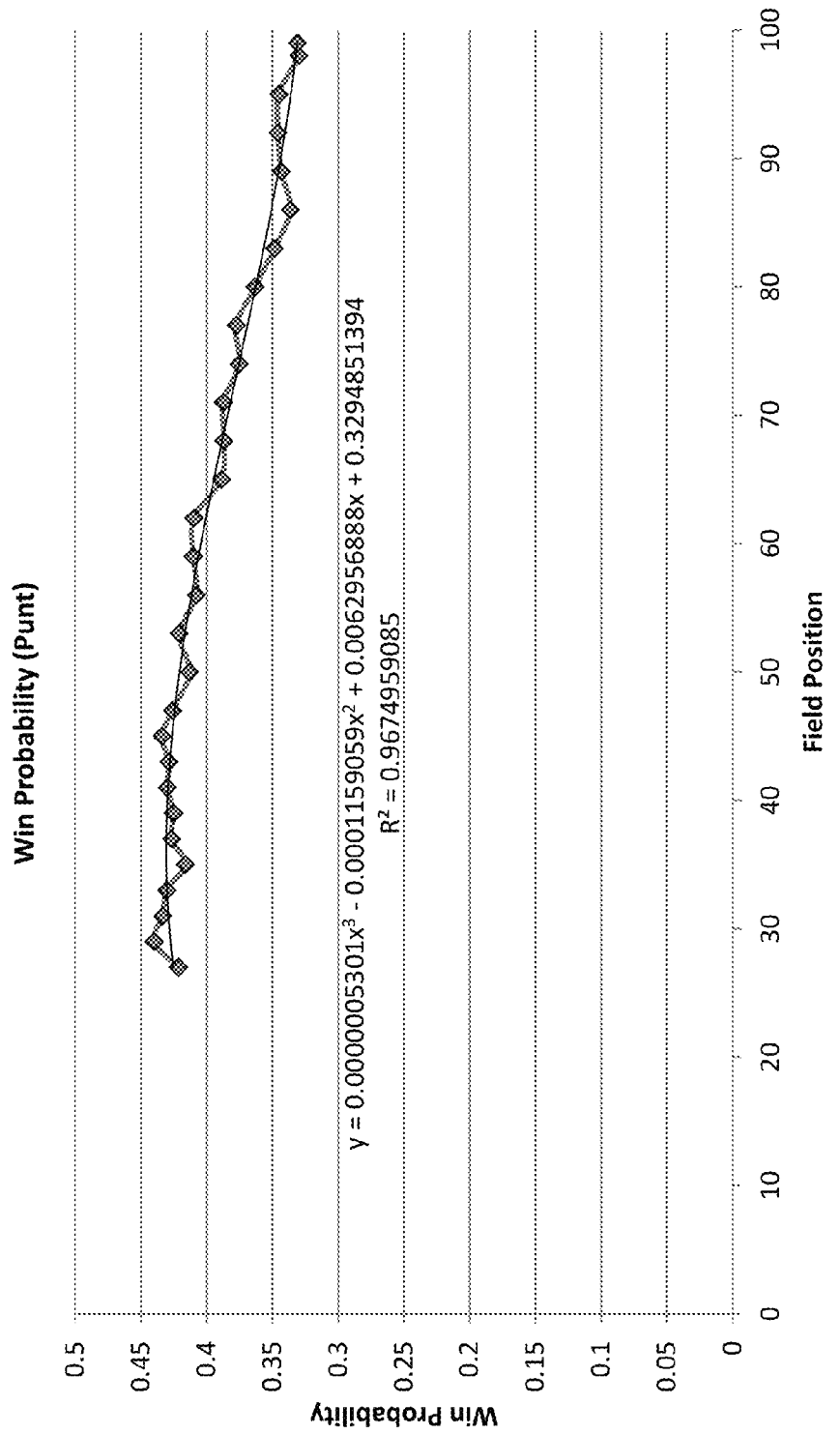
FIG. 20 is a graph and equation showing the win probability of a Punt decision.

Win Probability (Punt):

FIG. 17 shows an exemplary method for calculating the Win Probability of the Punt coaching decision 1704. In this embodiment, the probability of each play outcome was taken into account during the simulation to generate an overall Win Probability, so there is no need to consider the probability of each individual play outcome after the simulation. For a given game scenario, this overall Win Probability may be expressed as a function of field position, as shown in FIG. 20, where field position is presented along the x-axis (with 0 representing the opponent's goal line and 100 representing the team's own goal line) and win probability is presented along the y-axis. The data points in FIG. 20 represent the actual results from the simulation module 1200 at each field position. A best-fit equation may be produced to smooth and eliminate small noise in the data for subsequent use. If a team chooses to punt, the YTG for a first down becomes irrelevant.

Win Probability (Field Goal):

FIG. 17 shows an exemplary method for calculating the Win Probability of the Field Goal coaching decision 1706. For a made field goal and a given game scenario, the probability of winning the game would be the same regardless of field position. Although a 50-yard field goal would be more difficult and less likely than a 20-yard field goal, for example, the odds of winning the game would be the same regardless of whether the kicker made the 50-yard or the 20-yard field goal.

According to an exemplary embodiment of the present disclosure, for a missed field goal, the probability of winning the game may be associated with an unsuccessful conversion attempt. After a missed field goal, the worst field position for the opposing team is its own 20-yard line. In the NFL, the opposing team is given the ball at the spot the kick was actually tried, which is normally 7 yards behind the line of scrimmage. For example, if the line of scrimmage is the 22-yard line, the opposing team would take over from a missed field goal at the 29-yard line. Therefore, the probability of winning the game may be the same as an unsuccessful conversion attempt from the spot of the kick, but not less than the 20-yard line.

As an example, if a team is facing a 50-yard field goal from the 33-yard line (where the kick distance includes an additional 10 yards from the goal line to the goal post and an additional 7 yards from the line of scrimmage to the spot of the kick) with a make rate of 40%, the probability of another outcome would be 60%. The overall win probability associated with the Field Goal coaching decision would be 41% (calculated as 50% (win probability with made field goal)×40% (probability of made field goal)+35% (win probability with missed field goal)×60% (probability of missed field goal)). In this example, the opposing team would take over from a missed field goal at the spot of the kick (i.e., the 40-yard line) in a professional game and from the line of scrimmage (i.e., the 33-yard line) in a collegiate game. Therefore, the probability of winning the game with the missed field goal may be the same as an unsuccessful conversion attempt from the 40-yard line for a professional game and the 33-yard line for a collegiate game.

Figure 22:
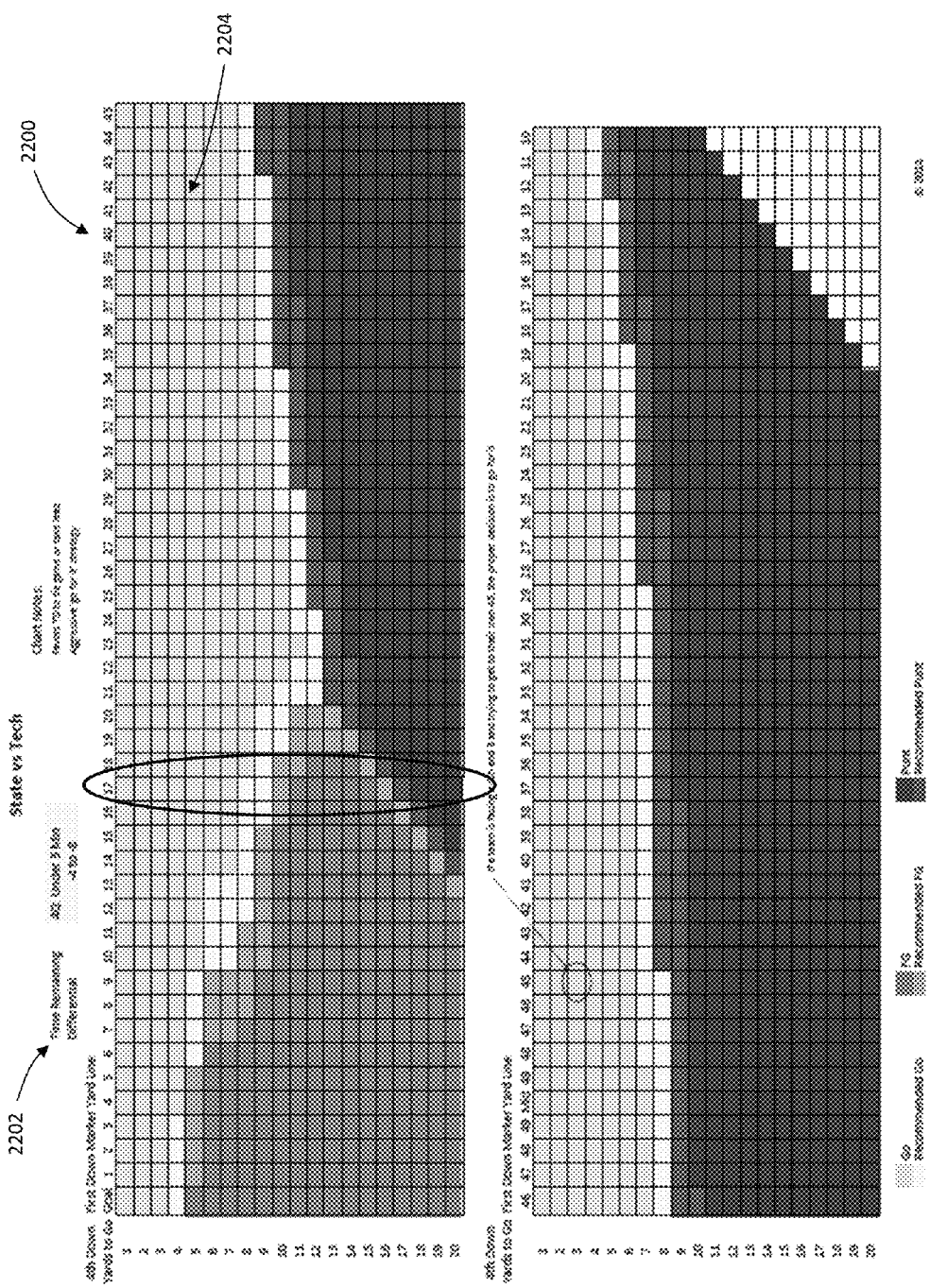
FIG. 22 is an exemplary recommendation chart for a fourth down play.

Chart:

An exemplary fourth down chart 2200 is shown in FIG. 22. The chart 2200 visually displays recommendations as a function of the first down marker (FDM) yard line along the x-axis and yards to gain (YTG) for first down along the y-axis. In this embodiment, from left to right on the chart 2200, the FDM yard lines move from the opponent's goal line (labeled "Goal") toward the team's own goal line. It is also within the scope of the present disclosure that chart 2200 may display the current field position (FP) rather than the FDM yard line (where FP=FDM+/−YTG). For example, if the FDM is the opponent's 17-yard line with 5 YTG, the current FP is the 22-yard line. However, because the FDM yard line is determined during a first down play, the coach may conveniently focus on a single FDM column beginning with the first down play until the fourth down play.

Each chart 2200 may be associated with a particular game scenario, such as a particular score differential and a particular amount of time remaining. In the illustrated example, the chart 2200 is associated with a particular score differential of −4 to −8 points (e.g., −7 points) and a particular amount of time remaining in the game of more than 5 minutes (e.g., 10 minutes) to play in the fourth quarter, as shown in field 2202.

The chart 2200 includes a plurality of cells 2204, one for each combination of FDM and YTG. During the course of the game, the coach could face a fourth down coaching decision corresponding to any cell 2204 on the chart 2200. For each cell 2204, a Win Probability may be calculated for each coaching decision (Go For It, Field Goal, Punt) by inputting the corresponding FP for the cell 2204 (where FP=FDM+/−YTG) into the equations discussed above with respect to FIGS. 17-20 with proper weighting based on likelihood of occurrence. Sample calculations are shown in FIG. 21 to generate "Final Win Odds" for each coaching decision (Go For It, Field Goal, Punt). By relying on these equations, the producer may avoid having to run simulations based on every individual cell 2204.

Each cell 2204 may identify the coaching decision that provides the highest Win Probability. The recommended coaching decision may be communicated using colors, symbols, or words, for example. Continuing with the example when the FDM is the opponent's 17-yard line in FIG. 22, the chart 2200 recommends Go For It when the YTG distance is relatively short and the odds of conversion are relatively high. In this particular example, because the team is down by 7 points, converting a first down and having a chance to score the touchdown to tie has significant value. As converting the first down becomes less likely, the Field Goal option comes into play. As the YTG distance becomes greater, the distance of the Field Goal starts to diminish the odds of making the field goal to the point where Punt becomes a better decision. Specifically, the chart 2200 recommends Go For It when YTG is 9 or less (or FP is 26 or less), Field Goal when YTG is 10 to 16 (or FP is 27 to 33), and Punt when YTG is 17 or more (or FP is 34 or more).

The chart 2200 may also identify when two different coaching decisions have similar Win Probabilities. In FIG. 22, for example, the cells labeled "Recommended" are favored by a Win Probability of 1% or less. In other words, there is not a clear winner between two adjacent coaching decisions. Continuing with the example when the FDM is the opponent's 17-yard line in FIG. 22, the Go For It decision provides a relatively significant Win Probability when YTG is 3 but a relatively slight Win Probability when YTG is 9. In this example, the team would hurt its chances of winning by choosing the Field Goal decision when YTG is 3 but would not significantly hurt its chances of winning by choosing the Field Goal decision when YTG is 9.

Chart Series:

In addition to the chart 2200 shown in FIG. 22, a plurality of other charts may be provided as set forth in Table 19 below to prepare for various other game scenarios, in this case various score differential and time remaining scenarios. In total, charts may be provided to account for 5, 10, 15, 20 or more different game scenarios. Additional charts may be developed at the discretion of the team. For example, additional charts may be developed for less than 2 or 3 minutes remaining in the fourth quarter. Also, additional charts may be developed depending on how many timeouts each team has remaining

TABLE 19

| Quarters 1-3 | First Half (<4 minutes) | Quarter 4 (≥5 minutes) | Quarter 4 (<5 minutes) | Overtime |
|---|---|---|---|---|
| +15 or more | Any | +17 or more | +17 or more | Tied |
| +8 to +14 | | +12 to +16 | +11 to +16 | −3 |
| −7 to +7 | | +9 to +11 | +9 to +10 | |
| −8 to −14 | | +4 to +8 | +6 to +8 | |
| −15 or more | | +1 to +3 | +4 to +5 | |
| | | Tied | +3 | |
| | | −1 to −3 | +1 to +2 | |
| | | −4 to −8 | Tied | |
| | | −9 to −11 | −1 to −2 | |
| | | −12 to −16 | −3 | |
| | | −17 or more | −4 to −6 | |
| | | | −7 | |
| | | | −8 | |
| | | | −9 | |
| | | | −10 | |
| | | | −11 | |
| | | | −12 or more | |

In general, more charts may be provided toward the end of the game because, with few (if any) possessions remaining, each score differential may call for significantly different strategies. At the beginning of the game, by contrast, the exact score differential and time remaining is much less important because there are multiple possessions remaining in the game. For example, with only a couple minutes remaining in the fourth quarter, a team that is down by four points would get very little value from a field goal. As another example, at the beginning of the game, deciding on a strategy that causes the team to go up by more than a touchdown becomes less important in the decision given the multiple possessions remaining in the game.

(C) Extra Point Recommendation

Figure 23:
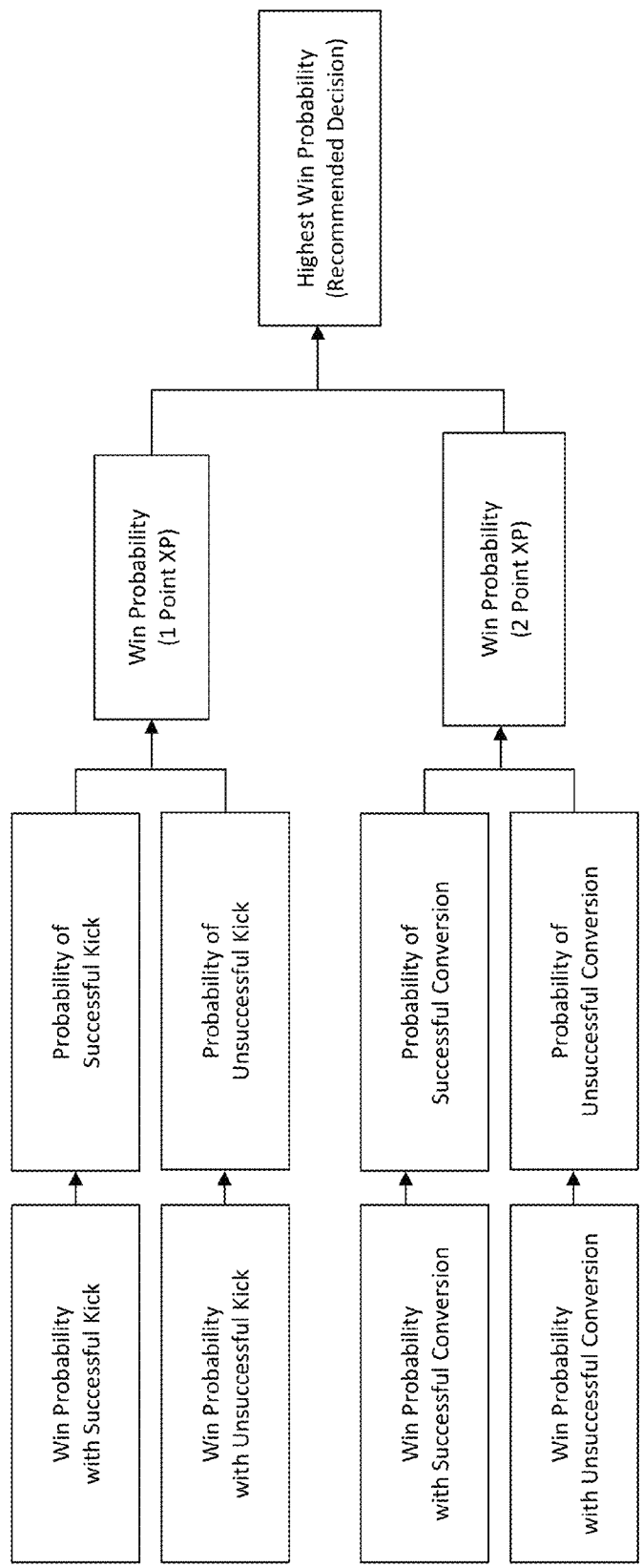
FIG. 23 is a flow chart of the recommendation module for an extra point play.

The process of calculating the Win Probability for each extra point coaching decision (1 Point XP and 2 Point XP) and recommending the best coaching decision is summarized in FIG. 23. The process is similar to that set forth in FIG. 17 for the fourth down coaching decision. As an example, if a team is leading by 6 points after a touchdown with 5 minutes remaining, the Win Probability associated with a 1 Point XP may be 74.9% (calculated as 75% (win probability with successful kick)×98% (probability of successful kick)+68% (win probability with unsuccessful kick)×2% (probability of unsuccessful kick)), and the Win Probability associated with a 2 Point XP may be 73.6% (calculated as 80% (win probability with successful conversion)×47% (probability of successful conversion)+68% (win probability with unsuccessful conversion)×53% (probability of unsuccessful conversion)). In this example, the 1 Point XP is recommended.

Figure 24:
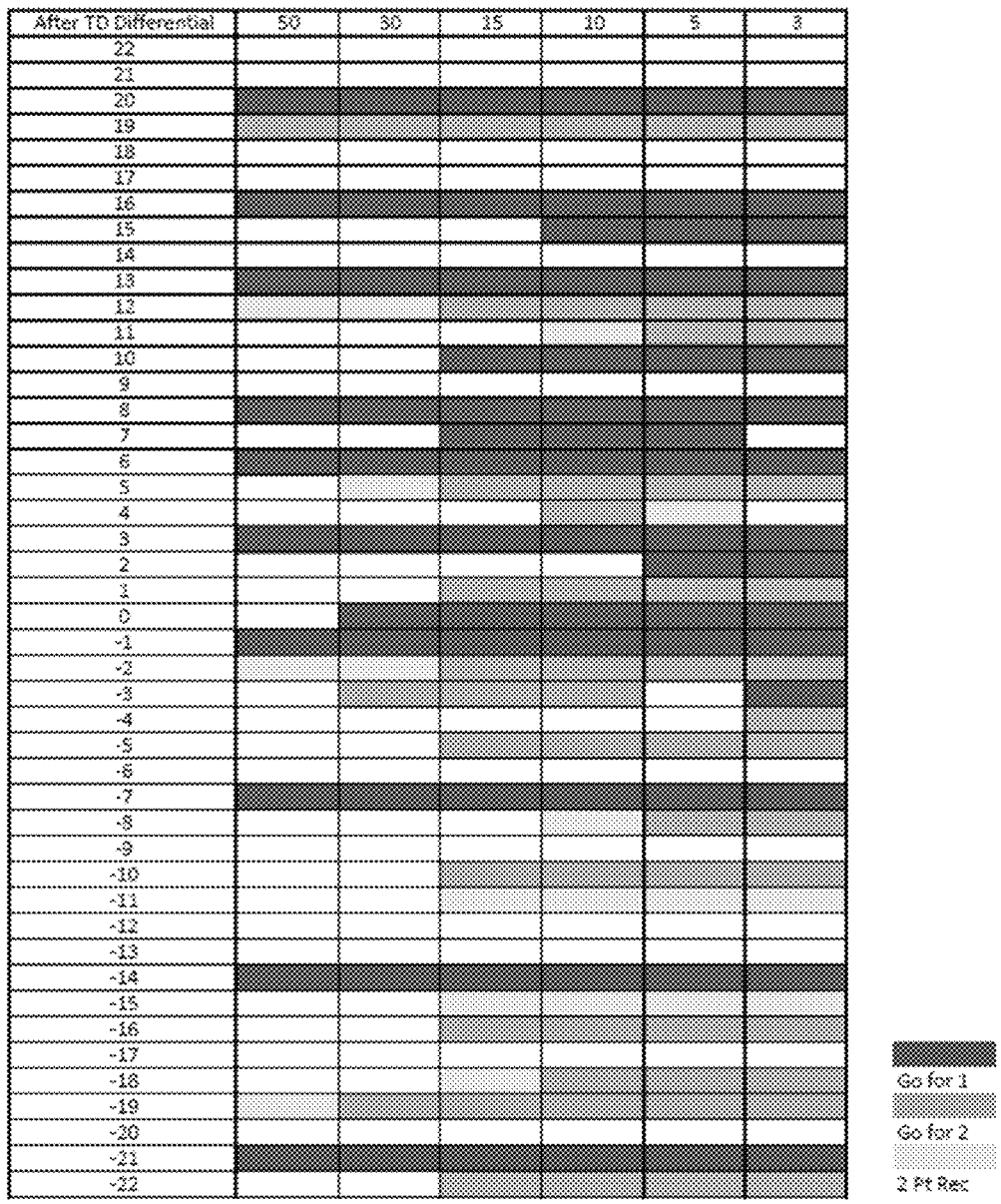
FIG. 24 is an exemplary recommendation chart for an extra point play.

Extra point coaching decisions may be recommended using chart 2400 of FIG. 24, for example. The chart 2400 visually displays recommendations as a function of the time remaining in the game along the x-axis (e.g., 50, 30, 15, 10, 5, and 3 minutes) and score differential along the y-axis (e.g., −22 to +22).

EXAMPLES

Case Study #1: Alabama vs. LSU (2012)

Game Scenario: With LSU leading 17-14 late in the 4th Quarter, LSU was faced with a 4th & 6 from the Alabama 28. LSU's three options were:

Go For It: While going for it against a dominant Alabama defense didn't have a great chance of success (around 30%) with just 1:40 remaining and Alabama out of timeouts, a converted first down would have resulted in a certain LSU victory.

Punt: While punting from the Alabama 28 would be unusual, LSU has an excellent punter and forcing Alabama to go additional yardage to score would provide benefit.

Field Goal: A made field goal (success rate of 62%) would prevent Alabama from being able to tie with a field goal of their own. However, Alabama would still be able to take the lead with a touchdown regardless of outcome and would have decent field position after a miss or a potentially dangerous kick-off return after a make.

Recommendation: The present system recommended the Go For It decision with a win probability of 92.56%. The win probability associated with the Punt decision was 91.63%, and the win probability associated with the Field Goal decision was only 89.70%.

Outcome: LSU made the decision to kick a Field Goal but missed, giving Alabama the ball on the 28-yard line with no btimeouts and a relatively shorter field. Alabama scored a touchdown, and went on to win the National Championship.

Case Study #2: USC Vs. Notre Dame (2012)

Game Scenario: USC trailed Notre Dame 22-13 and faced a 4th & Goal from the Notre Dame 1 with 2:38 to play in the 4th Quarter. USC's options were:

Go For It: Facing a top-rated defense with a struggling offense and the back-up QB, scoring the TD was a tough proposition (success rate of only about 35%). A successful conversion would allow USC to take the lead with either a FG or TD.

Field Goal: A successful FG was a near certainty (99%) and would put USC in position down six to take the lead with a subsequent TD.

Recommendation: The present system recommended the Field Goal decision with a win probability of 9.32%. The win probability associated with the Go For It decision was only 3.40%.

Outcome: USC made the decision to Go For It, but threw an incomplete pass and went on to lose the game.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of recommending one of a plurality of coaching decisions to a coach of a team playing a football game against an opponent, the method comprising the steps of:
receiving, before the football game, at least one indicator regarding a quality of the team;
determining a probability of success for each coaching decision based, at least in part, on the at least one indicator;
based on predetermined probabilities of events occurring after each coaching decision, repeatedly simulating a remainder of the football game following each coaching decision using a computing system;
associating each coaching decision with a probability of winning the football game based on the simulating step; and
recommending the coaching decision having the highest probability of winning the football game.

2. The method of claim 1, wherein the at least one indicator is an expected number of points that the team will score against the opponent.

3. The method of claim 2, wherein the expected number of points is based on an expected point spread between the team and the opponent.

4. The method of claim 1, wherein the at least one indicator is a rating of a player or a group of players on the team relative to an average player or group of players.

5. The method of claim 4, wherein the at least one indicator is a rating of a field goal kicker, a punter, a punt receiver, or a punt coverage team.

6. The method of claim 1, wherein the determining step, the simulating step, the associating step, and the recommending step are performed before the football game.

7. The method of claim 1, wherein the determining step comprises adjusting an average probability of success based on the at least one indicator.

8. The method of claim 1, further comprising the step of generating an equation based on the simulating step that represents the probability of winning the football game as a function of field position.

9. The method of claim 8, further comprising the step of inputting a plurality of different field positions into the equation to calculate a probability of winning the football game at each field position.

10. The method of claim 1, wherein the simulating step considers a minimum number of plays remaining in the football game when the team is ahead of the opponent, and a maximum number of plays remaining in the football game when the team is trailing the opponent.

11. The method of claim 1, wherein the plurality of coaching decisions is associated with a fourth down play, the plurality of coaching decisions comprising whether to go for a first down, kick a field goal, or punt.

12. The method of claim 1, wherein the plurality of coaching decisions is associated with an extra point play, the plurality of coaching decisions comprising whether to go for 1-point conversion or a 2-point conversion.

13. A method of recommending one of a plurality of coaching decisions to a coach of a team playing a football game against an opponent, the method comprising the steps of:
determining a probability of success for each coaching decision from each of a plurality of different positions on a football field;
based on predetermined probabilities of events occurring after each coaching decision, repeatedly simulating a remainder of the football game from a first game scenario to determine a probability of winning the football game with each coaching decision in the first game scenario;
recommending a first coaching decision for each of the plurality of different positions on the football field corresponding to the first game scenario;
based on predetermined probabilities of events occurring after each coaching decision, repeatedly simulating a remainder of the football game from a second game scenario to determine a probability of winning the football game with each coaching decision in the second game scenario;

recommending a second coaching decision for each of the plurality of different positions on the football field corresponding to the second game scenario; and generating a visual representation of the first and second recommended coaching decisions.

14. The method of claim 13, wherein the visual representation displays the first and second recommended coaching decisions as a function of a first down marker yard line and a yards to go for a first down.

15. The method of claim 13, wherein a score differential and a time remaining in the football game differ between the first and second game scenarios.

16. The method of claim 13, further comprising the step of identifying when the probability of winning the football game with a first coaching decision is close to the probability of winning the football game with a second coaching decision.

17. The method of claim 13, further comprising the step of adjusting the probability of success of at least one coaching decision based on a weather condition.

18. The method of claim 1, wherein the simulating step utilizes a random number generator.

19. The method of claim 1, wherein, when the coaching decision is whether to attempt a first down conversion or whether to kick a field goal, the probability of winning the football game is calculated by weighting an output from the simulating step by the probability of success for the corresponding conversion coaching decision or field goal coaching decision.

20. The method of claim 1, wherein, when the coaching decision is whether to punt, the probability of success for the punt coaching decision is taken into account during the simulating step.

21. The method of claim 1, wherein the simulating step is performed a hundred times or more for each coaching decision.

* * * * *